United States Patent
Mashimo et al.

(10) Patent No.: US 12,460,271 B2
(45) Date of Patent: Nov. 4, 2025

(54) METHOD FOR DETECTING SPECIFIC DNA IN A SAMPLE

(71) Applicants: C4U CORPORATION, Suita (JP); OSAKA UNIVERSITY, Suita (JP)

(72) Inventors: Tomoji Mashimo, Suita (JP); Kazuto Yoshimi, Suita (JP); Satomi Shibumura, Suita (JP)

(73) Assignees: C4U CORPORATION, Suita (JP); OSAKA UNIVERSITY, Suita (JP)

( * ) Notice: Subject to any disclaimer, the term of this patent is extended or adjusted under 35 U.S.C. 154(b) by 694 days.

(21) Appl. No.: 17/794,704

(22) PCT Filed: Jan. 25, 2021

(86) PCT No.: PCT/JP2021/002372
§ 371 (c)(1),
(2) Date: Jul. 22, 2022

(87) PCT Pub. No.: WO2021/149829
PCT Pub. Date: Jul. 29, 2021

(65) Prior Publication Data
US 2023/0099483 A1    Mar. 30, 2023

(30) Foreign Application Priority Data

Jan. 24, 2020  (JP) ................................ 2020-010216
May 18, 2020  (JP) ................................ 2020-086698

(51) Int. Cl.
C12Q 1/68       (2018.01)
C12Q 1/70       (2006.01)
C12Q 1/683      (2018.01)
C12Q 1/6844     (2018.01)

(52) U.S. Cl.
CPC ............... *C12Q 1/701* (2013.01); *C12Q 1/68* (2013.01); *C12Q 1/683* (2013.01); *C12Q 1/6844* (2013.01); *C12Q 2600/156* (2013.01)

(58) Field of Classification Search
None
See application file for complete search history.

(56) References Cited

U.S. PATENT DOCUMENTS

2019/0359973 A1    11/2019   Kmiec et al.

FOREIGN PATENT DOCUMENTS

| AU | 2018279457 A1 * | 12/2019 | ........... A01K 67/027 |
| CA | 3 048 501 A1    | 7/2018  | |
| CN | 111394421 A     | 7/2020  | |
| JP | 2015-503535 A   | 2/2015  | |

(Continued)

OTHER PUBLICATIONS

Extended European Search Report dated Sep. 9, 2024 in Application No. 21744534.5.

(Continued)

*Primary Examiner* — Nicole Kinsey White
(74) *Attorney, Agent, or Firm* — Sughrue Mion, PLLC

(57) ABSTRACT

It has been found that by mixing a single-stranded probe DNA whose cleavage can be detected in a reaction system containing a CRISPR-Cas3 system and a sample from which to detect a target DNA, it is possible to detect the target DNA in the sample by using, as indication, a signal generated by the cleavage of the single-stranded probe DNA.

1 Claim, 19 Drawing Sheets
Specification includes a Sequence Listing.

(56) References Cited

FOREIGN PATENT DOCUMENTS

WO         2018/225858 A1    12/2018
WO    WO-2019241452 A1 * 12/2019  ........... C12N 15/102

OTHER PUBLICATIONS

Communication, dated Aug. 4, 2022, issued by the International Bureau in International Application No. PCT/JP2021/002372.
Luuk Loeff et al., "Repetitive DNA Reeling by the Cascade-Cas3 Complex in Nucleotide Unwinding Steps", Molecular Cell, May 3, 2018, pp. 385-394, vol. 70.
Janice S. Chen et al., "CRISPR-Cas12a target binding unleashes indiscriminate single-stranded DNase activity", Science, 2018, pp. 436-439, vol. 360.
Lucas B. Harrington et al., "Programmed DNA destruction by miniature CRISPR-Cas14 enzymes", Science, 2018, pp. 839-842, vol. 362.
Kazuto Yoshimi et al., "Rapid and accurate detection of novel coronavirus SARS-CoV-2 using CRISPR-Cas3", medRxiv [online], Jun. 2, 2020.
Fujii, Tomoaki et al., "2. Genome editing technology CRISPR-Cas3 and its gene therapy and application to diagnosis", Experimental medicine, Nov. 2020, pp. 49-54, vol. 38 No. 17.
International Search Report of PCT/JP2021/002372 dated Mar. 16, 2021 [PCT/ISA/210].

\* cited by examiner

*: p<0.05, **:p<0.01

**:p<0.01

SEQUENCE LISTING

<160> NUMBER OF SEQ ID NOS: 47

<210> SEQ ID NO 1
<211> LENGTH: 888
<212> TYPE: PRT
<213> ORGANISM: Escherichia coli

<400> SEQUENCE: 1

```
Met Glu Pro Phe Lys Tyr Ile Cys His Tyr Trp Gly Lys Ser Ser Lys
1               5                   10                  15

Ser Leu Thr Lys Gly Asn Asp Ile His Leu Ile Tyr His Cys Leu
            20                  25                  30

Asp Val Ala Ala Val Ala Asp Cys Trp Trp Asp Gln Ser Val Val Leu
                35                  40                  45

Gln Asn Thr Phe Cys Arg Asn Glu Met Leu Ser Lys Gln Arg Val Lys
        50                  55                  60

Ala Trp Leu Leu Phe Phe Ile Ala Leu His Asp Ile Gly Lys Phe Asp
65                  70                  75                  80

Ile Arg Phe Gln Tyr Lys Ser Ala Glu Ser Trp Leu Lys Leu Asn Pro
                85                  90                  95

Ala Thr Pro Ser Leu Asn Gly Pro Ser Thr Gln Met Cys Arg Lys Phe
            100                 105                 110

Asn His Gly Ala Ala Gly Leu Tyr Trp Phe Asn Gln Asp Ser Leu Ser
        115                 120                 125

Glu Gln Ser Leu Gly Asp Phe Phe Ser Phe Asp Ala Ala Pro His
    130                 135                 140

Pro Tyr Glu Ser Trp Phe Pro Trp Val Glu Ala Val Thr Gly His His
145                 150                 155                 160

Gly Phe Ile Leu His Ser Gln Asp Gln Asp Lys Ser Arg Trp Glu Met
                165                 170                 175

Pro Ala Ser Leu Ala Ser Tyr Ala Ala Gln Asp Lys Gln Ala Arg Glu
            180                 185                 190

Glu Trp Ile Ser Val Leu Glu Ala Leu Phe Leu Thr Pro Ala Gly Leu
        195                 200                 205

Ser Ile Asn Asp Ile Pro Pro Asp Cys Ser Ser Leu Leu Ala Gly Phe
    210                 215                 220

Cys Ser Leu Ala Asp Trp Leu Gly Ser Trp Thr Thr Thr Asn Thr Phe
225                 230                 235                 240

Leu Phe Asn Glu Asp Ala Pro Ser Asp Ile Asn Ala Leu Arg Thr Tyr
                245                 250                 255

Phe Gln Asp Arg Gln Gln Asp Ala Ser Arg Val Leu Glu Leu Ser Gly
            260                 265                 270

Leu Val Ser Asn Lys Arg Cys Tyr Glu Gly Val His Ala Leu Leu Asp
        275                 280                 285

Asn Gly Tyr Gln Pro Arg Gln Leu Gln Val Leu Val Asp Ala Leu Pro
    290                 295                 300

Val Ala Pro Gly Leu Thr Val Ile Glu Ala Pro Thr Gly Ser Gly Lys
305                 310                 315                 320

Thr Glu Thr Ala Leu Ala Tyr Ala Trp Lys Leu Ile Asp Gln Gln Ile
                325                 330                 335

Ala Asp Ser Val Ile Phe Ala Leu Pro Thr Gln Ala Thr Ala Asn Ala
            340                 345                 350

Met Leu Thr Arg Met Glu Ala Ser Ala Ser His Leu Phe Ser Ser Pro
        355                 360                 365
```

-continued

```
Asn Leu Ile Leu Ala His Gly Asn Ser Arg Phe Asn His Leu Phe Gln
    370                 375                 380
Ser Ile Lys Ser Arg Ala Ile Thr Glu Gln Gly Gln Glu Glu Ala Trp
385                 390                 395                 400
Val Gln Cys Cys Gln Trp Leu Ser Gln Ser Asn Lys Lys Val Phe Leu
                    405                 410                 415
Gly Gln Ile Gly Val Cys Thr Ile Asp Gln Val Leu Ile Ser Val Leu
                420                 425                 430
Pro Val Lys His Arg Phe Ile Arg Gly Leu Gly Ile Gly Arg Ser Val
            435                 440                 445
Leu Ile Val Asp Glu Val His Ala Tyr Asp Thr Tyr Met Asn Gly Leu
        450                 455                 460
Leu Glu Ala Val Leu Lys Ala Gln Ala Asp Val Gly Gly Ser Val Ile
465                 470                 475                 480
Leu Leu Ser Ala Thr Leu Pro Met Lys Gln Lys Gln Lys Leu Leu Asp
                    485                 490                 495
Thr Tyr Gly Leu His Thr Asp Pro Val Glu Asn Asn Ser Ala Tyr Pro
                500                 505                 510
Leu Ile Asn Trp Arg Gly Val Asn Gly Ala Gln Arg Phe Asp Leu Leu
            515                 520                 525
Ala His Pro Glu Gln Leu Pro Pro Arg Phe Ser Ile Gln Pro Glu Pro
        530                 535                 540
Ile Cys Leu Ala Asp Met Leu Pro Asp Leu Thr Met Leu Glu Arg Met
545                 550                 555                 560
Ile Ala Ala Ala Asn Ala Gly Ala Gln Val Cys Leu Ile Cys Asn Leu
                    565                 570                 575
Val Asp Val Ala Gln Val Cys Tyr Gln Arg Leu Lys Glu Leu Asn Asn
                580                 585                 590
Thr Gln Val Asp Ile Asp Leu Phe His Ala Arg Phe Thr Leu Asn Asp
            595                 600                 605
Arg Arg Glu Lys Glu Asn Arg Val Ile Ser Asn Phe Gly Lys Asn Gly
        610                 615                 620
Lys Arg Asn Val Gly Arg Ile Leu Val Ala Thr Gln Val Val Glu Gln
625                 630                 635                 640
Ser Leu Asp Val Asp Phe Asp Trp Leu Ile Thr Gln His Cys Pro Ala
                    645                 650                 655
Asp Leu Leu Phe Gln Arg Leu Gly Arg Leu His Arg His His Arg Lys
                660                 665                 670
Tyr Arg Pro Ala Gly Phe Glu Ile Pro Val Ala Thr Ile Leu Leu Pro
            675                 680                 685
Asp Gly Glu Gly Tyr Gly Arg His Glu His Ile Tyr Ser Asn Val Arg
        690                 695                 700
Val Met Trp Arg Thr Gln Gln His Ile Glu Glu Leu Asn Gly Ala Ser
705                 710                 715                 720
Leu Phe Phe Pro Asp Ala Tyr Arg Gln Trp Leu Asp Ser Ile Tyr Asp
                    725                 730                 735
Asp Ala Glu Met Asp Glu Pro Glu Trp Val Gly Asn Gly Met Asp Lys
                740                 745                 750
Phe Glu Ser Ala Glu Cys Glu Lys Arg Phe Lys Ala Arg Lys Val Leu
            755                 760                 765
Gln Trp Ala Glu Glu Tyr Ser Leu Gln Asp Asn Asp Glu Thr Ile Leu
        770                 775                 780
Ala Val Thr Arg Asp Gly Glu Met Ser Leu Pro Leu Leu Pro Tyr Val
```

```
                785                 790                 795                 800
    Gln Thr Ser Ser Gly Lys Gln Leu Leu Asp Gly Gln Val Tyr Glu Asp
                        805                 810                 815

Leu Ser His Glu Gln Gln Tyr Glu Ala Leu Ala Leu Asn Arg Val Asn
                820                 825                 830

Val Pro Phe Thr Trp Lys Arg Ser Phe Ser Glu Val Val Asp Glu Asp
                835                 840                 845

Gly Leu Leu Trp Leu Glu Gly Lys Gln Asn Leu Asp Gly Trp Val Trp
                850                 855                 860

Gln Gly Asn Ser Ile Val Ile Thr Tyr Thr Gly Asp Glu Gly Met Thr
    865                 870                 875                 880

Arg Val Ile Pro Ala Asn Pro Lys
                        885

<210> SEQ ID NO 2
<211> LENGTH: 502
<212> TYPE: PRT
<213> ORGANISM: Escherichia coli

<400> SEQUENCE: 2

Met Asn Leu Leu Ile Asp Asn Trp Ile Pro Val Arg Pro Arg Asn Gly
    1               5                   10                  15

Gly Lys Val Gln Ile Ile Asn Leu Gln Ser Leu Tyr Cys Ser Arg Asp
                    20                  25                  30

Gln Trp Arg Leu Ser Leu Pro Arg Asp Asp Met Glu Leu Ala Ala Leu
                35                  40                  45

Ala Leu Leu Val Cys Ile Gly Gln Ile Ile Ala Pro Ala Lys Asp Asp
                50                  55                  60

Val Glu Phe Arg His Arg Ile Met Asn Pro Leu Thr Glu Asp Glu Phe
    65                  70                  75                  80

Gln Gln Leu Ile Ala Pro Trp Ile Asp Met Phe Tyr Leu Asn His Ala
                    85                  90                  95

Glu His Pro Phe Met Gln Thr Lys Gly Val Lys Ala Asn Asp Val Thr
                    100                 105                 110

Pro Met Glu Lys Leu Leu Ala Gly Val Ser Gly Ala Thr Asn Cys Ala
                    115                 120                 125

Phe Val Asn Gln Pro Gly Gln Gly Glu Ala Leu Cys Gly Gly Cys Thr
                130                 135                 140

Ala Ile Ala Leu Phe Asn Gln Ala Asn Gln Ala Pro Gly Phe Gly Gly
    145                 150                 155                 160

Gly Phe Lys Ser Gly Leu Arg Gly Gly Thr Pro Val Thr Thr Phe Val
                    165                 170                 175

Arg Gly Ile Asp Leu Arg Ser Thr Val Leu Leu Asn Val Leu Thr Leu
                    180                 185                 190

Pro Arg Leu Gln Lys Gln Phe Pro Asn Glu Ser His Thr Glu Asn Gln
                    195                 200                 205

Pro Thr Trp Ile Lys Pro Ile Lys Ser Asn Glu Ser Ile Pro Ala Ser
                210                 215                 220

Ser Ile Gly Phe Val Arg Gly Leu Phe Trp Gln Pro Ala His Ile Glu
    225                 230                 235                 240

Leu Cys Asp Pro Ile Gly Ile Gly Lys Cys Ser Cys Gly Gln Glu
                    245                 250                 255

Ser Asn Leu Arg Tyr Thr Gly Phe Leu Lys Glu Lys Phe Thr Phe Thr
                    260                 265                 270
```

```
Val Asn Gly Leu Trp Pro His Pro His Ser Pro Cys Leu Val Thr Val
            275                 280                 285

Lys Lys Gly Glu Val Glu Lys Phe Leu Ala Phe Thr Thr Ser Ala
290                 295                 300

Pro Ser Trp Thr Gln Ile Ser Arg Val Val Asp Lys Ile Ile Gln
305                 310                 315                 320

Asn Glu Asn Gly Asn Arg Val Ala Ala Val Val Asn Gln Phe Arg Asn
                325                 330                 335

Ile Ala Pro Gln Ser Pro Leu Glu Leu Ile Met Gly Gly Tyr Arg Asn
            340                 345                 350

Asn Gln Ala Ser Ile Leu Glu Arg Arg His Asp Val Leu Met Phe Asn
            355                 360                 365

Gln Gly Trp Gln Gln Tyr Gly Asn Val Ile Asn Glu Ile Val Thr Val
370                 375                 380

Gly Leu Gly Tyr Lys Thr Ala Leu Arg Lys Ala Leu Tyr Thr Phe Ala
385                 390                 395                 400

Glu Gly Phe Lys Asn Lys Asp Phe Lys Gly Ala Gly Val Ser Val His
                405                 410                 415

Glu Thr Ala Glu Arg His Phe Tyr Arg Gln Ser Glu Leu Leu Ile Pro
            420                 425                 430

Asp Val Leu Ala Asn Val Asn Phe Ser Gln Ala Asp Glu Val Ile Ala
            435                 440                 445

Asp Leu Arg Asp Lys Leu His Gln Leu Cys Glu Met Leu Phe Asn Gln
            450                 455                 460

Ser Val Ala Pro Tyr Ala His His Pro Lys Leu Ile Ser Thr Leu Ala
465                 470                 475                 480

Leu Ala Arg Ala Thr Leu Tyr Lys His Leu Arg Glu Leu Lys Pro Gln
                485                 490                 495

Gly Gly Pro Ser Asn Gly
            500

<210> SEQ ID NO 3
<211> LENGTH: 160
<212> TYPE: PRT
<213> ORGANISM: Escherichia coli

<400> SEQUENCE: 3

Met Ala Asp Glu Ile Asp Ala Met Ala Leu Tyr Arg Ala Trp Gln Gln
1               5                   10                  15

Leu Asp Asn Gly Ser Cys Ala Gln Ile Arg Arg Val Ser Glu Pro Asp
            20                  25                  30

Glu Leu Arg Asp Ile Pro Ala Phe Tyr Arg Leu Val Gln Pro Phe Gly
        35                  40                  45

Trp Glu Asn Pro Arg His Gln Ala Leu Leu Arg Met Val Phe Cys
    50                  55                  60

Leu Ser Ala Gly Lys Asn Val Ile Arg His Gln Asp Lys Lys Ser Glu
65                  70                  75                  80

Gln Thr Thr Gly Ile Ser Leu Gly Arg Ala Leu Ala Asn Ser Gly Arg
                85                  90                  95

Ile Asn Glu Arg Arg Ile Phe Leu Ile Arg Ala Asp Arg Thr Ala
            100                 105                 110

Asp Met Val Gln Leu Arg Arg Leu Leu Thr His Ala Glu Pro Val Leu
        115                 120                 125

Asp Trp Pro Leu Met Ala Arg Met Leu Thr Trp Trp Gly Lys Arg Glu
    130                 135                 140
```

Arg Gln Gln Leu Leu Glu Asp Phe Val Leu Thr Thr Asn Lys Asn Ala
145                 150                 155                 160

<210> SEQ ID NO 4
<211> LENGTH: 224
<212> TYPE: PRT
<213> ORGANISM: Escherichia coli

<400> SEQUENCE: 4

Met Arg Ser Tyr Leu Ile Leu Arg Leu Ala Gly Pro Met Gln Ala Trp
1               5                   10                  15

Gly Gln Pro Thr Phe Glu Gly Thr Arg Pro Thr Gly Arg Phe Pro Thr
                20                  25                  30

Arg Ser Gly Leu Leu Gly Leu Leu Gly Ala Cys Leu Gly Ile Gln Arg
            35                  40                  45

Asp Asp Thr Ser Ser Leu Gln Ala Leu Ser Glu Ser Val Gln Phe Ala
        50                  55                  60

Val Arg Cys Asp Glu Leu Ile Leu Asp Asp Arg Arg Val Ser Val Thr
65                  70                  75                  80

Gly Leu Arg Asp Tyr His Thr Val Leu Gly Ala Arg Glu Asp Tyr Arg
                85                  90                  95

Gly Leu Lys Ser His Glu Thr Ile Gln Thr Trp Arg Glu Tyr Leu Cys
            100                 105                 110

Asp Ala Ser Phe Thr Val Ala Leu Trp Leu Thr Pro His Ala Thr Met
        115                 120                 125

Val Ile Ser Glu Leu Glu Lys Ala Val Leu Lys Pro Arg Tyr Thr Pro
130                 135                 140

Tyr Leu Gly Arg Arg Ser Cys Pro Leu Thr His Pro Leu Phe Leu Gly
145                 150                 155                 160

Thr Cys Gln Ala Ser Asp Pro Gln Lys Ala Leu Leu Asn Tyr Glu Pro
                165                 170                 175

Val Gly Gly Asp Ile Tyr Ser Glu Glu Ser Val Thr Gly His His Leu
            180                 185                 190

Lys Phe Thr Ala Arg Asp Glu Pro Met Ile Thr Leu Pro Arg Gln Phe
        195                 200                 205

Ala Ser Arg Glu Trp Tyr Val Ile Lys Gly Gly Met Asp Val Ser Gln
210                 215                 220

<210> SEQ ID NO 5
<211> LENGTH: 199
<212> TYPE: PRT
<213> ORGANISM: Escherichia coli

<400> SEQUENCE: 5

Met Tyr Leu Ser Lys Val Ile Ile Ala Arg Ala Trp Ser Arg Asp Leu
1               5                   10                  15

Tyr Gln Leu His Gln Gly Leu Trp His Leu Phe Pro Asn Arg Pro Asp
                20                  25                  30

Ala Ala Arg Asp Phe Leu Phe His Val Glu Lys Arg Asn Thr Pro Glu
            35                  40                  45

Gly Cys His Val Leu Leu Gln Ser Ala Gln Met Pro Val Ser Thr Ala
        50                  55                  60

Val Ala Thr Val Ile Lys Thr Lys Gln Val Glu Phe Gln Leu Gln Val
65                  70                  75                  80

Gly Val Pro Leu Tyr Phe Arg Leu Arg Ala Asn Pro Ile Lys Thr Ile
                85                  90                  95

Leu Asp Asn Gln Lys Arg Leu Asp Ser Lys Gly Asn Ile Lys Arg Cys
            100                 105                 110

Arg Val Pro Leu Ile Lys Glu Ala Glu Gln Ile Ala Trp Leu Gln Arg
            115                 120                 125

Lys Leu Gly Asn Ala Ala Arg Val Glu Asp Val His Pro Ile Ser Glu
        130                 135                 140

Arg Pro Gln Tyr Phe Ser Gly Asp Gly Lys Ser Gly Lys Ile Gln Thr
145                 150                 155                 160

Val Cys Phe Glu Gly Val Leu Thr Ile Asn Asp Ala Pro Ala Leu Ile
                165                 170                 175

Asp Leu Val Gln Gln Gly Ile Gly Pro Ala Lys Ser Met Gly Cys Gly
            180                 185                 190

Leu Leu Ser Leu Ala Pro Leu
            195

<210> SEQ ID NO 6
<211> LENGTH: 363
<212> TYPE: PRT
<213> ORGANISM: Escherichia coli

<400> SEQUENCE: 6

Met Ser Asn Phe Ile Asn Ile His Val Leu Ile Ser His Ser Pro Ser
1               5                   10                  15

Cys Leu Asn Arg Asp Asp Met Asn Met Gln Lys Asp Ala Ile Phe Gly
            20                  25                  30

Gly Lys Arg Arg Val Arg Ile Ser Ser Gln Ser Leu Lys Arg Ala Met
        35                  40                  45

Arg Lys Ser Gly Tyr Tyr Ala Gln Asn Ile Gly Glu Ser Ser Leu Arg
    50                  55                  60

Thr Ile His Leu Ala Gln Leu Arg Asp Val Leu Arg Gln Lys Leu Gly
65                  70                  75                  80

Glu Arg Phe Asp Gln Lys Ile Ile Asp Lys Thr Leu Ala Leu Leu Ser
                85                  90                  95

Gly Lys Ser Val Asp Glu Ala Glu Lys Ile Ser Ala Asp Ala Val Thr
            100                 105                 110

Pro Trp Val Val Gly Glu Ile Ala Trp Phe Cys Glu Gln Val Ala Lys
        115                 120                 125

Ala Glu Ala Asp Asn Leu Asp Asp Lys Lys Leu Leu Lys Val Leu Lys
    130                 135                 140

Glu Asp Ile Ala Ala Ile Arg Val Asn Leu Gln Gln Gly Val Asp Ile
145                 150                 155                 160

Ala Leu Ser Gly Arg Met Ala Thr Ser Gly Met Met Thr Glu Leu Gly
                165                 170                 175

Lys Val Asp Gly Ala Met Ser Ile Ala His Ala Ile Thr Thr His Gln
            180                 185                 190

Val Asp Ser Asp Ile Asp Trp Phe Thr Ala Val Asp Asp Leu Gln Glu
        195                 200                 205

Gln Gly Ser Ala His Leu Gly Thr Gln Glu Phe Ser Ser Gly Val Phe
    210                 215                 220

Tyr Arg Tyr Ala Asn Ile Asn Leu Ala Gln Leu Gln Glu Asn Leu Gly
225                 230                 235                 240

Gly Ala Ser Arg Glu Gln Ala Leu Glu Ile Ala Thr His Val His
                245                 250                 255

Met Leu Ala Thr Glu Val Pro Gly Ala Lys Gln Arg Thr Tyr Ala Ala

```
                 260                 265                 270
        Phe Asn Pro Ala Asp Met Val Met Val Asn Phe Ser Asp Met Pro Leu
                     275                 280                 285

Ser Met Ala Asn Ala Phe Glu Lys Ala Val Lys Ala Lys Asp Gly Phe
                     290                 295                 300

Leu Gln Pro Ser Ile Gln Ala Phe Asn Gln Tyr Trp Asp Arg Val Ala
        305                 310                 315                 320

Asn Gly Tyr Gly Leu Asn Gly Ala Ala Ala Gln Phe Ser Leu Ser Asp
                         325                 330                 335

Val Asp Pro Ile Thr Ala Gln Val Lys Gln Met Pro Thr Leu Glu Gln
                     340                 345                 350

Leu Lys Ser Trp Val Arg Asn Asn Gly Glu Ala
                     355                 360
```

<210> SEQ ID NO 7
<211> LENGTH: 2667
<212> TYPE: DNA
<213> ORGANISM: Escherichia coli

<400> SEQUENCE: 7

| | | | | |
|---|---|---|---|---|
| atggaacctt | ttaaatatat | atgccattac | tggggaaaat | cctcaaaaag cttgacgaaa | 60 |
| ggaaatgata | ttcatctgtt | aatttatcat | tgccttgatg | ttgctgctgt tgcagattgc | 120 |
| tggtgggatc | aatcagtcgt | actgcaaaat | acttttttgcc | gaaatgaaat gctatcaaaa | 180 |
| cagagggtga | aggcctggct | gttatttttc | attgctcttc | atgatattgg aaagtttgat | 240 |
| atacgattcc | aatataaatc | agcagaaagt | tggctgaaat | aaatcctgc aacgccatca | 300 |
| cttaatggtc | catcaacaca | aatgtgccgt | aaatttaatc | atggtgcagc cggtctgtat | 360 |
| tggtttaacc | aggattcact | ttcagagcaa | tctctcgggg | atttttttcag tttttttgat | 420 |
| gccgctcctc | atccttatga | gtcctggttt | ccatgggtag | aggccgttac aggacatcat | 480 |
| ggttttatat | tacattccca | ggatcaagat | aagtcgcgtt | gggaaatgcc agcttctctg | 540 |
| gcatcttatg | ctgcgcaaga | taaacaggct | cgtgaggagt | ggatatctgt actggaagca | 600 |
| ttatttttaa | cgccagcggg | gttatctata | aacgatatac | acctgattg ttcatcactg | 660 |
| ttagcaggtt | tttgctcgct | tgctgactgg | ttaggctcct | ggactacaac gaataccttt | 720 |
| ctgtttaatg | aggatgcgcc | ttccgacata | aatgctctga | acgtatttt ccaggaccga | 780 |
| cagcaggatg | cgagccgggt | attggagttg | agtggacttg | tatcaaataa gcgatgttat | 840 |
| gaaggtgttc | atgcactact | ggacaatggc | tatcaaccca | gacaattaca ggtgttagtt | 900 |
| gatgctcttc | cagtagctcc | cgggctgacg | gtaatagagg | cacctacagg ctccggtaaa | 960 |
| acggaaacag | cgctggccta | tgcttggaaa | cttattgatc | aacaaattgc ggatagtgtt | 1020 |
| attttttgccc | tcccaacaca | agctaccgcg | aatgctatgc | ttacgagaat ggaagcgagc | 1080 |
| gcgagccact | tatttttcatc | cccaaatctt | attcttgctc | atggcaattc acggtttaac | 1140 |
| cacctctttc | aatcaataaa | atcacgcgcg | attactgaac | aggggcaaga agaagcgtgg | 1200 |
| gttcagtgtt | gtcagtggtt | gtcacaaagc | aataagaaag | tgtttcttgg gcaaatcggc | 1260 |
| gtttgcacga | ttgatcaggt | gttgatatcg | gtattgccag | ttaaacaccg ctttatccgt | 1320 |
| ggtttgggaa | ttggtcgaag | tgttttaatt | gttgatgaag | ttcatgctta cgacacctat | 1380 |
| atgaacggct | tgctggaggc | agtgctcaag | gctcaggctg | atgtggggagg gagtgttatt | 1440 |
| cttctttccg | caaccctacc | aatgaaacaa | aaacagaaac | ttctggatac ttatggtctg | 1500 |
| catacagatc | cagtggaaaa | taactccgca | tatccactca | ttaactggcg aggtgtgaat | 1560 |

```
ggtgcgcaac gttttgatct gctagctcat ccagaacaac tcccgcccg cttttcgatt      1620 cagccagaac ctatttgttt agctgacatg ttacctgacc ttacgatgtt agagcgaatg      1680
atcgcagcgg caaacgcggg tgcacaggtc tgtcttattt gcaatttggt tgacgttgca      1740
caagtatgct accaacggct aaaggagcta ataacacgc aagtagatat agatttgttt      1800
catgcgcgct ttacgctgaa cgatcgtcgt gaaaagaga atcgagttat tagcaatttc      1860
ggcaaaaatg ggaagcgaaa tgttggacgg atacttgtcg caacccaggt cgtgaacaa      1920 tcactcgacg ttgattttga ttggttaatt actcagcatt gtcctgcaga tttgcttttc      1980
caacgattgg gccgtttaca tcgccatcat cgcaaatatc gtcccgctgg ttttgagatt      2040
cctgttgcca ccattttgct gcctgatggc gagggttacg gacgacatga gcatatttat      2100
agcaacgtta gagtcatgtg gcggacgcag caacatattg aggagcttaa tggagcatcc      2160
ttatttttcc ctgatgctta ccggcaatgg ctggatagca tttacgatga tgcggaaatg      2220
gatgagccag aatgggtcgg caatggcatg ataaatttg aaagcgccga gtgtgaaaaa      2280
aggttcaagg ctcgcaaggt cctgcagtgg gctgaagaat atagcttgca ggataacgat      2340
gaaaccattc ttgcggtaac gagggatggg gaaatgagcc tgccattatt gccttatgta      2400
caaacgtctt caggtaaaca actgctcgat ggccaggtct acgaggacct aagtcatgaa      2460
cagcagtatg aggcgcttgc acttaatcgc gtcaatgtac ccttcacctg gaaacgtagt      2520
ttttctgaag tagtagatga agatgggtta ctttggctgg aagggaaaca gaatctggat      2580
ggatgggtct ggcagggtaa cagtattgtt attacctata caggggatga agggatgacc      2640
agagtcatcc ctgcaaatcc caaataa                                         2667

<210> SEQ ID NO 8
<211> LENGTH: 1509
<212> TYPE: DNA
<213> ORGANISM: Escherichia coli

<400> SEQUENCE: 8
atgaatttgc ttattgataa ctggatccct gtacgcccgc gaaacggggg gaaagtccaa        60
atcataaatc tgcaatcgct atactgcagt agagatcagt ggcgattaag tttgccccgt       120
gacgatatgg aactggccgc tttagcactg ctggtttgca ttgggcaaat tatcgccccg       180
gcaaaagatg acgttgaatt tcgacatcgc ataatgaatc cgctcactga agatgagttt       240
caacaactca tcgcgccgtg gatagatatg ttctacctta atcacgcaga acatcccttt       300
atgcagacca aaggtgtcaa agcaaatgat gtgactccaa tggaaaaact gttggctggg       360
gtaagcggcg cgacgaattg tgcatttgtc aatcaaccgg ggcagggtga agcattatgt       420
ggtggatgca ctgcgattgc gttattcaac caggcgaatc aggcaccagg ttttggtggt       480
ggttttaaaa gcggtttacg tggaggaaca cctgtaacaa cgttcgtacg tgggatcgat       540
cttcgttcaa cggtgttact caatgtcctc acattacctc gtcttcaaaa acaatttcct       600
aatgaatcac atacggaaaa ccaacctacc tggattaaac ctatcaagtc caatgagtct       660
atacctgctt cgtcaattgg gtttgtccgt ggtctattct ggcaaccagc gcatattgaa       720
ttatgcgatc ccattgggat tggtaaatgt tcttgctgtg acaggaaag caatttgcgt       780 tataccggtt tcttaagga aaaatttacc tttacagtta atgggctatg ccccatccg       840 cattcccctt gtctggtaac agtcaagaaa ggggaggtta aggaaaaatt tcttgctttc       900
accacctccg caccatcatg gacacaaatc agccgagttg tggtagataa gattattcaa       960
```

```
aatgaaaatg gaaatcgcgt ggcggcggtt gtgaatcaat tcagaaatat tgcgccgcaa    1020
agtcctcttg aattgattat gggggatat cgtaataatc aagcatctat tcttgaacgg    1080
cgtcatgatg tgttgatgtt taatcagggg tggcaacaat acggcaatgt gataaacgaa   1140
atagtgactg ttggtttggg atataaaaca gccttacgca aggcgttata tacctttgca   1200
gaagggttta aaataaaga cttcaaaggg gccggagtct ctgttcatga gactgcagaa    1260
aggcatttct atcgacagag tgaattatta attcccgatg tactggcgaa tgttaatttt   1320
tcccaggctg atgaggtaat agctgattta cgagacaaac ttcatcaatt gtgtgaaatg   1380
ctatttaatc aatctgtagc tccctatgca catcatccta aattaataag cacattagcg   1440
cttgcccgcg ccacgctata caaacattta cgggagttaa accgcaagg agggccatca    1500 aatggctga                                                           1509

<210> SEQ ID NO 9
<211> LENGTH: 483
<212> TYPE: DNA
<213> ORGANISM: Escherichia coli

<400> SEQUENCE: 9
atggctgatg aaattgatgc aatggcttta tatcgagcct ggcaacaact ggataatgga     60
tcatgtgcgc aaattagacg tgtttcagaa cctgatgaat tacgcgatat ccctgcgttt   120
tataggctgg tgcaacccttt tggttgggaa acccacgtc accagcaggc tcttttgcgc   180
atggtgtttt gcctgagcgc aggaaagaat gtcatccgac atcaggacaa aaaatcggag   240
caaacaacag gtatctcgtt gggaagagct ttagccaata gtggaagaat taacgagcgc   300
cgtatctttc aattaattcg ggctgacaga acagccgata tggtccagtt acgtcgatta   360
cttactcacg ccgaacccgt acttgactgg ccattaatgg ccaggatgtt gacctggtgg   420
ggaaagcgcg aacgccagca acttctggaa gattttgtat tgaccacaaa caaaaatgcg   480
taa                                                                 483

<210> SEQ ID NO 10
<211> LENGTH: 675
<212> TYPE: DNA
<213> ORGANISM: Escherichia coli

<400> SEQUENCE: 10
atgagatctt atttgatctt gcggcttgct gggccaatgc aagcctgggg gcagccgacc     60
tttgaaggaa cgcgacctac cggaagattt ccgacccgaa gcgggttatt agggctactc   120
ggggcttgtc ttgggatcca acgtgatgat acttcttcat tacaggcgtt atcagagagt   180
gtgcaatttg cagtgcgctg cgatgaactc attcttgacg atcgtcgtgt gtctgtaacg   240 ggttgcgtg attaccatac agtccttgga gcgcgagaag attaccgtgg tttgaaaagt   300
catgaaacga ttcaaacatg gcgcgaatat ttatgtgatg cctcctttac cgtcgctctc   360
tggttaacac cccatgcaac gatggttatc tcagaacttg aaaaagcagt attaaagcct   420
cggtatacac cttacctggg gcggagaagt tgcccactaa cacaccgct tttttggg     480 acatgtcagg catcggatcc tcagaaggcg ctattaaatt atgagcccgt ggcggcgat    540 atatatagtg aggaatcagt tacagggcat catttaaaat ttacggcgcg cgacgaaccg   600
atgatcacct tgcctcgaca atttgcttcc cgagaatggt atgtgattaa aggaggtatg   660
gatgtatctc agtaa                                                    675
```

<210> SEQ ID NO 11
<211> LENGTH: 600
<212> TYPE: DNA
<213> ORGANISM: Escherichia coli

<400> SEQUENCE: 11

```
atgtatctca gtaaagtcat cattgccagg gcctggagca gggatcttta ccaacttcac      60
cagggattat ggcatttatt tccaaacaga ccggatgctg ctcgtgattt tcttttcat     120
gttgagaagc gaaacacacc agaaggctgt catgttttat tgcagtcagc gcaaatgcct    180
gtttcaactg ccgttgcgac agtcattaaa actaaacagg ttgaatttca acttcaggtt    240
ggtgttccac tctatttcg gcttcgggca atccgatca aaactattct cgacaatcaa      300
aagcgcctgg acagtaaagg gaatattaaa cgctgtcggg ttccgttaat aaaagaagca    360
gaacaaatcg cgtggttgca acgtaaattg ggcaatgcgg cgcgcgttga agatgtgcat    420
cccatatcgg aacggccaca gtatttttct ggtgatggta aaagtggaaa gatccaaacg    480
gtttgctttg aaggtgtgct caccatcaac gacgcgccag cgttaataga tcttgtacag    540
caaggtattg ggccagctaa atcgatggga tgtggcttgc tatctttggc tccactgtga    600
```

<210> SEQ ID NO 12
<211> LENGTH: 1092
<212> TYPE: DNA
<213> ORGANISM: Escherichia coli

<400> SEQUENCE: 12

```
atgtctaact ttatcaatat tcatgttctg atctctcaca gcccttcatg tctgaaccgc      60
gacgatatga acatgcagaa agacgctatt ttcggcggca aaagacgagt aagaatttca    120
agtcaaagcc ttaaacgtgc gatgcgtaaa agtggttatt acgcacaaaa tattggtgaa    180
tccagtctca gaaccattca tcttgcacaa ttacgtgatg ttcttcggca aaaacttggt    240
gaacgttttg accaaaaaat catcgataag acattagcgc tgctctccgg taaatcagtt    300
gatgaagccg aaaagatttc tgccgatgcg gttactccct gggttgtggg agaaatagcc    360
tggttctgtg agcaggttgc aaaagcagag gctgataatc tggatgataa aaagctgctc    420
aaagttctta aggaagatat tgccgccata cgtgtgaatt tacagcaggg tgttgatatt    480
gcgcttagtg aagaatggca accagcggc atgatgactg agttgggaaa agttgatggt    540
gcaatgtcca ttgcgcatgc gatcactact catcaggttg attctgatat tgactggttc    600
accgctgtag atgatttaca ggaacaaggt tctgcacatc tgggaactca ggaatttca     660
tcgggtgttt tttatcgtta tgccaacatt aacctcgctc aacttcagga aaatttaggt    720
ggtgcctcca gggagcaggc tctggaaatt gcaacccatg ttgttcatat gctggcaaca    780
gaggtccctg agcaaaaca gcgtactat gccgcttta accctgcgga tatggtaatg       840
gttaatttct ccgatatgcc actttctatg gcaaatgctt ttgaaaaagc ggttaaagcg    900
aaagatggct ttttgcaacc gtctatacag gcgtttaatc aatattggga tcgcgttgcc    960
aatggatatg gtctgaacgg agctgctgcg caattcagct tatctgatgt agacccaatt   1020
actgctcaag ttaaacaaat gcctacttta gaacagttaa atcctgggt tcgtaataat   1080
ggcgaggcgt ga                                                       1092
```

<210> SEQ ID NO 13
<211> LENGTH: 7
<212> TYPE: PRT
<213> ORGANISM: Artificial Sequence
<220> FEATURE:

```
<223> OTHER INFORMATION: Synthetic sequence, NLS

<400> SEQUENCE: 13

Pro Lys Lys Lys Arg Lys Val
1               5

<210> SEQ ID NO 14
<211> LENGTH: 19
<212> TYPE: PRT
<213> ORGANISM: Artificial Sequence
<220> FEATURE:
<223> OTHER INFORMATION: Synthetic sequence, bpNLS

<400> SEQUENCE: 14

Lys Arg Thr Ala Asp Gly Ser Glu Phe Glu Ser Pro Lys Lys Lys Arg
1               5                   10                  15

Lys Val Glu

<210> SEQ ID NO 15
<211> LENGTH: 60
<212> TYPE: DNA
<213> ORGANISM: Artificial Sequence
<220> FEATURE:
<223> OTHER INFORMATION: Synthetic sequence, Target DNA(hEMX1)
<220> FEATURE:
<221> NAME/KEY: protein_bind
<222> LOCATION: (16)..(18)
<223> OTHER INFORMATION: various PAM sequence
<220> FEATURE:
<221> NAME/KEY: misc_feature
<222> LOCATION: (16)..(18)
<223> OTHER INFORMATION: n is a, c, g, or t

<400> SEQUENCE: 15
tggcgcattg ccacgnnnca ggccaatggg gaggacatcg atgtcacctc caatgactag     60

<210> SEQ ID NO 16
<211> LENGTH: 60
<212> TYPE: DNA
<213> ORGANISM: Artificial Sequence
<220> FEATURE:
<223> OTHER INFORMATION: Synthetic sequence, Target DNA(mTyr)
<220> FEATURE:
<221> NAME/KEY: protein_bind
<222> LOCATION: (16)..(18)
<223> OTHER INFORMATION: various PAM sequence
<220> FEATURE:
<221> NAME/KEY: misc_feature
<222> LOCATION: (16)..(18)
<223> OTHER INFORMATION: n is a, c, g, or t

<400> SEQUENCE: 16
gcattactat gtgtcnnngg acacactgct tgggggctct gaaatatgga gggacattga     60

<210> SEQ ID NO 17
<211> LENGTH: 16
<212> TYPE: DNA
<213> ORGANISM: Artificial Sequence
<220> FEATURE:
<223> OTHER INFORMATION: Synthetic sequence, Taqman probe sequence

<400> SEQUENCE: 17
gtcaacggat ttggtc                                                    16

<210> SEQ ID NO 18
<211> LENGTH: 35
<212> TYPE: DNA
<213> ORGANISM: SARS-CoV-2
```

```
<400> SEQUENCE: 18
aaggccaaac tgtcactaag aaatctgctg ctgag                          35

<210> SEQ ID NO 19
<211> LENGTH: 35
<212> TYPE: DNA
<213> ORGANISM: SARS-CoV-2

<400> SEQUENCE: 19
aaggaactga ttacaaacat tggccgcaaa ttgca                          35

<210> SEQ ID NO 20
<211> LENGTH: 41
<212> TYPE: DNA
<213> ORGANISM: Artificial Sequence
<220> FEATURE:
<223> OTHER INFORMATION: Synthetic sequence, primer "SARS-N1-FIP"

<400> SEQUENCE: 20
gttggccttt accagacatt ttggtgatgc tgctcttgct t                   41

<210> SEQ ID NO 21
<211> LENGTH: 42
<212> TYPE: DNA
<213> ORGANISM: Artificial Sequence
<220> FEATURE:
<223> OTHER INFORMATION: Synthetic sequence, primer "SARS-N1-BIP"

<400> SEQUENCE: 21
tgctgaggct tctaagaagc cagcttgtgt tacattgtat gc                  42

<210> SEQ ID NO 22
<211> LENGTH: 19
<212> TYPE: DNA
<213> ORGANISM: Artificial Sequence
<220> FEATURE:
<223> OTHER INFORMATION: Synthetic sequence, primer "SARS-N1-F3"

<400> SEQUENCE: 22
acttctcctg ctagaatgg                                            19

<210> SEQ ID NO 23
<211> LENGTH: 18
<212> TYPE: DNA
<213> ORGANISM: Artificial Sequence
<220> FEATURE:
<223> OTHER INFORMATION: Synthetic sequence, primer "SARS-N1-B3"

<400> SEQUENCE: 23
gtttgttctg gaccacgt                                             18

<210> SEQ ID NO 24
<211> LENGTH: 22
<212> TYPE: DNA
<213> ORGANISM: Artificial Sequence
<220> FEATURE:
<223> OTHER INFORMATION: Synthetic sequence, primer "SARS-N1-LF"

<400> SEQUENCE: 24
ttcaatctgt caagcagcag ca                                        22

<210> SEQ ID NO 25
<211> LENGTH: 21
<212> TYPE: DNA
```

```
<213> ORGANISM: Artificial Sequence
<220> FEATURE:
<223> OTHER INFORMATION: Synthetic sequence, primer "SARS-N1-LB"

<400> SEQUENCE: 25
ggcaaaaacg tactgccact a                                        21

<210> SEQ ID NO 26
<211> LENGTH: 44
<212> TYPE: DNA
<213> ORGANISM: Artificial Sequence
<220> FEATURE:
<223> OTHER INFORMATION: Synthetic sequence, primer "SARS-N2-FIP"

<400> SEQUENCE: 26
tctgattagt tcctggtccc caaagcatac aatgtaacac aagc                44

<210> SEQ ID NO 27
<211> LENGTH: 39
<212> TYPE: DNA
<213> ORGANISM: Artificial Sequence
<220> FEATURE:
<223> OTHER INFORMATION: Synthetic sequence, primer "SARS-N2-BIP"

<400> SEQUENCE: 27
cgcattggca tggaagtcac tttgatggca cctgtgtag                      39

<210> SEQ ID NO 28
<211> LENGTH: 18
<212> TYPE: DNA
<213> ORGANISM: Artificial Sequence
<220> FEATURE:
<223> OTHER INFORMATION: Synthetic sequence, primer "SARS-N2-F3"

<400> SEQUENCE: 28
gcaaaaacgt actgccac                                             18

<210> SEQ ID NO 29
<211> LENGTH: 22
<212> TYPE: DNA
<213> ORGANISM: Artificial Sequence
<220> FEATURE:
<223> OTHER INFORMATION: Synthetic sequence, primer "SARS-N2-B3"

<400> SEQUENCE: 29
gaaatttgga tctttgtcat cc                                        22

<210> SEQ ID NO 30
<211> LENGTH: 17
<212> TYPE: DNA
<213> ORGANISM: Artificial Sequence
<220> FEATURE:
<223> OTHER INFORMATION: Synthetic sequence, primer "SARS-N2-LF"

<400> SEQUENCE: 30
tggaccacgt ctgccga                                              17

<210> SEQ ID NO 31
<211> LENGTH: 18
<212> TYPE: DNA
<213> ORGANISM: Artificial Sequence
<220> FEATURE:
<223> OTHER INFORMATION: Synthetic sequence, primer "SARS-N2-LB"

<400> SEQUENCE: 31
accttcggga acgtggtt                                             18
```

<210> SEQ ID NO 32
<211> LENGTH: 16
<212> TYPE: DNA
<213> ORGANISM: Artificial Sequence
<220> FEATURE:
<223> OTHER INFORMATION: Synthetic sequence, probe sequence for lateral
      flow assay

<400> SEQUENCE: 32
gtcaacggat ttggtc                                                        16

<210> SEQ ID NO 33
<211> LENGTH: 32
<212> TYPE: DNA
<213> ORGANISM: Artificial Sequence
<220> FEATURE:
<223> OTHER INFORMATION: Synthetic sequence, crRNA "H1N1-Cascade-I38"

<400> SEQUENCE: 33
tgcagcaaac ttattagttt caattttggg gt                                      32

<210> SEQ ID NO 34
<211> LENGTH: 32
<212> TYPE: DNA
<213> ORGANISM: Artificial Sequence
<220> FEATURE:
<223> OTHER INFORMATION: Synthetic sequence, crRNA "H3N2-Cascade-I38"

<400> SEQUENCE: 34
tgcactcact tggaggtgtg tttcatgtat tc                                      32

<210> SEQ ID NO 35
<211> LENGTH: 32
<212> TYPE: DNA
<213> ORGANISM: Artificial Sequence
<220> FEATURE:
<223> OTHER INFORMATION: Synthetic sequence, crRNA "H1N1-Cascade-I222"

<400> SEQUENCE: 35
attgagaaca caagagtctg aatgtgcatg tg                                      32

<210> SEQ ID NO 36
<211> LENGTH: 32
<212> TYPE: DNA
<213> ORGANISM: Artificial Sequence
<220> FEATURE:
<223> OTHER INFORMATION: Synthetic sequence, crRNA "H1N1-Cascade-H274"

<400> SEQUENCE: 36
taattagggg ctttcatttc gactgatttg at                                      32

<210> SEQ ID NO 37
<211> LENGTH: 32
<212> TYPE: DNA
<213> ORGANISM: Artificial Sequence
<220> FEATURE:
<223> OTHER INFORMATION: Synthetic sequence, crRNA "H3N2-Cascade-N294"

<400> SEQUENCE: 37
ctgtctctgc agacacatct gacaccagga ta                                      32

<210> SEQ ID NO 38
<211> LENGTH: 80
<212> TYPE: DNA
<213> ORGANISM: Influenza A virus

<400> SEQUENCE: 38
gggaagaccc caaaattgaa actaataagt ttgctgcaat

```
<210> SEQ ID NO 45
<211> LENGTH: 80
<212> TYPE: DNA
<213> ORGANISM: Influenza A virus

<400> SEQUENCE: 45
aaagataatc aaatcagtcg aaatgaaagc ccctaattat tactatgagg aatgctcctg    60
ttaccctgat tctagtgaaa                                                80

<210> SEQ ID NO 46
<211> LENGTH: 80
<212> TYPE: DNA
<213> ORGANISM: Influenza A virus

<400> SEQUENCE: 46
tatcctcgat atcctggtgt cagatgtgtc tgcagagaca actggaaagg atccaaccgg    60
cccatcatag atataaacat                                                80

<210> SEQ ID NO 47
<211> LENGTH: 80
<212> TYPE: DNA
<213> ORGANISM: Influenza A virus

<400> SEQUENCE: 47
tatcctcgat atcctggtgt cagatgtgtc tgcagagaca gctggaaagg atccaaccgg    60
cccatcatag atataaacat                                                80
```

METHOD FOR DETECTING SPECIFIC DNA IN A SAMPLE

CROSS REFERENCE TO RELATED APPLICATIONS

This application is a National Stage of International Application No. PCT/JP2021/002372, filed Jan. 25, 2021, claiming priorities to Japanese Patent Application No. 2020-010216, filed Jan. 24, 2020 and Japanese Patent Application No. 2020-086698, filed May 18, 2020.

TECHNICAL FIELD

The present invention relates to a method for detecting a specific DNA in a sample by utilizing a CRISPR-Cas3 system and a single-stranded probe DNA.

BACKGROUND ART

The genome editing technologies are technologies to specifically cleave genomic DNA sequences in cells of animals and plants and to rewritten the sequences into any desired sequences freely by utilizing the inherent repair mechanisms. The utilization of the genome editing technologies has been expanded not only to the bioscience research but also to cultivar improvements of agricultural crops and livestock, regenerative medicines, and genome editing treatments all over the world.

The CRISPR-Cas systems which bacteria and archaea have are classified into Class 1 that cleaves target sequences using a complex of multiple proteins and Class 2 that cleaves target sequences using a single protein. The CRISPR-Cas9 system, the CRISPR-Cas12 (Cpf1) system, the CRISPR-Cas13 system, and the like, which have been developed as genome editing tools so far, are all classified into Class 2.

Under such circumstances, the present inventors have found that the CRISPR-Cas3 system, which is a type I CRISPR-Cas system belonging to Class 1, can be used as a genome editing tool for eukaryotic cells (PTL 1).

However, the detailed molecular mechanism on how the CRISPR-Cas3 system cleaves DNAs and introduces mutations has not been revealed yet.

CITATION LIST

Patent Literature

[PTL 1] International Publication No. WO2018/225858

SUMMARY OF INVENTION

Technical Problem

An object of the present invention is to clarify the molecular mechanism of DNA cleavage by the CRISPR-Cas3 system and to provide a method for detecting a target DNA using the molecular mechanism. A further object of the present invention is to provide a kit for use in the detection method.

Solution to Problem

The present inventors have made earnest studies to achieve the above objects, and have finally found that when the CRISPR-Cas3 system recognizes and binds to a target DNA in a sample, the CRISPR-Cas3 system cleaves single-stranded DNAs (ssDNAs) present therearound at random. Moreover, the present inventors have found that based on this finding, by mixing a single-stranded probe DNA whose cleavage can be detected in a reaction system containing a CRISPR-Cas3 system and a sample from which to detect a target DNA, it is possible to detect the target DNA in the sample using, as indication, a signal generated by the cleavage of the single-stranded probe DNA, and have completed the present invention.

Specifically, the present invention relates to a method for detecting a target DNA utilizing random cleavage of a single-stranded DNA by a CRISPR-Cas3 system, and a kit for use in the detection method, and more specifically provides the following.

(1) A method for detecting a specific DNA in a sample, comprising the steps of:
  (a) contacting the sample with a CRISPR-Cas3 system targeting the specific DNA and a single-stranded probe DNA; and
  (b) detecting cleavage of the single-stranded probe DNA by the CRISPR-Cas3 system that occurs in a case where the specific DNA is present in the sample.

(2) A kit for detecting a specific DNA in a sample by the method according to (1), comprising:
  (a) a CRISPR-Cas3 system targeting the specific DNA; and
  (b) a single-stranded probe DNA.

Advantageous Effects of Invention

The present invention makes it possible to detect a target DNA in a sample by utilizing a CRISPR-Cas3 system and a single-stranded probe DNA. The method of the present invention can detect a target DNA in a sample by using, as indication, a signal generated by the cleavage of the single-stranded probe DNA, and is simple and easy (see FIG. 10). Although only in the case where the CRISPR-Cas3 system correctly recognizes and binds to the target DNA, the CRISPR-Cas3 system cleaves the single-stranded probe DNA, the specificity in the detection of the target DNA is a single base level, and is significantly high. In addition, the method of the present invention can detect the target DNA even when only a trace amount of the target DNA is present in the sample. For example, by combining the method with a gene amplification method such as the RPA (recombinase polymerase amplification) method or the LAMP (loop-mediated isothermal amplification) method, it is possible to detect a target DNA even in a case where only 1 copy to 10 copies of the target DNA are present in the sample, thus achieving a high sensitivity.

The method of the present invention can be utilized as tools for next-generation diagnoses such as, for example, identification of viruses using various body fluids (urine, saliva, serum, plasma, whole blood, and the like) as samples in a short time, application to liquid biopsy for detecting a trace amount of DNA and mutation thereof in bloods, or detection of a trace amount of pathogenic DNA contained in metagenome depending on the type of the pathogenic DNA, or the like.

As similar methods, DETECTR and Cas14-DETECTR using CRISPR-Cas12a and CRISPR-Cas14a, which belong to Class 2, have been reported (Chen et al., Science. 2018 Apr. 27; 360(6387): 436-439, Harrington et al., Science. 2018 Nov. 16; 362 (6416) 839-842). While target sequences in these systems have 21 bases and 20 bases, respectively, the CRISPR-Cas3 system, which is a type I CRISPR-Cas system belonging to Class 1, has a longer target sequence of 27 bases. Therefore, the CRISPR-Cas3 system can detect target DNAs with higher specificity than the conventional systems.

DESCRIPTION OF EMBODIMENTS

Figure 1:
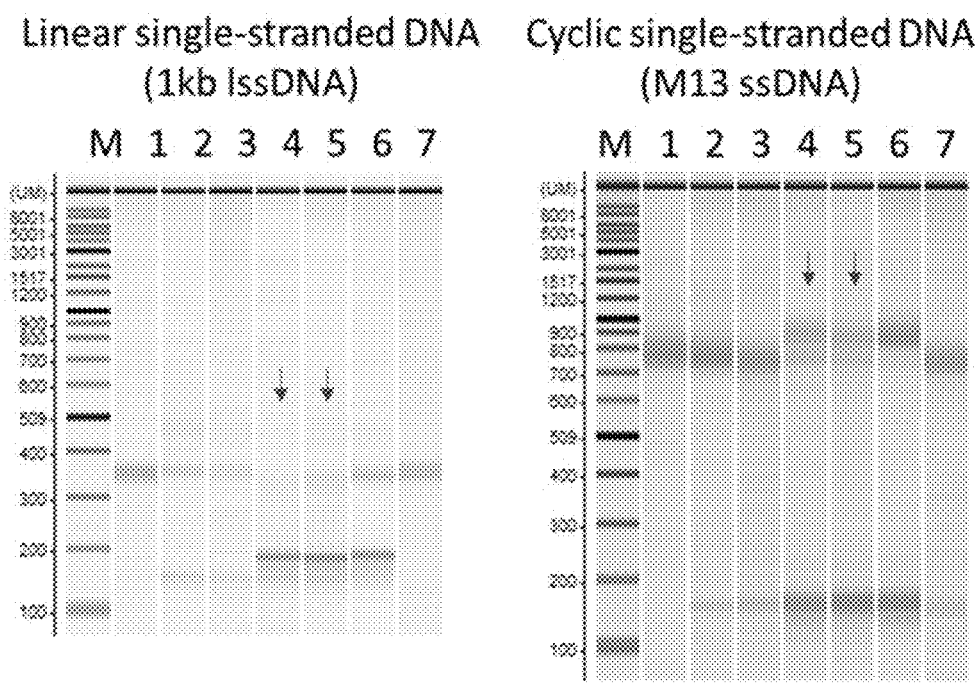
FIG. 1 is a diagram showing that a CRISPR-Cas3 system non-specifically cleaves the single-stranded DNA in the presence of a hEMX1 target sequence. The upper part of the diagram shows compositions of samples, and the lower part of the diagram shows the results of capillary electrophoresis. Non-specific single-stranded DNA cleavage activity was observed only in samples 4 and 5 in which DNA fragments containing appropriate PAM sequence and target sequence were present (arrows).
Figure 2:
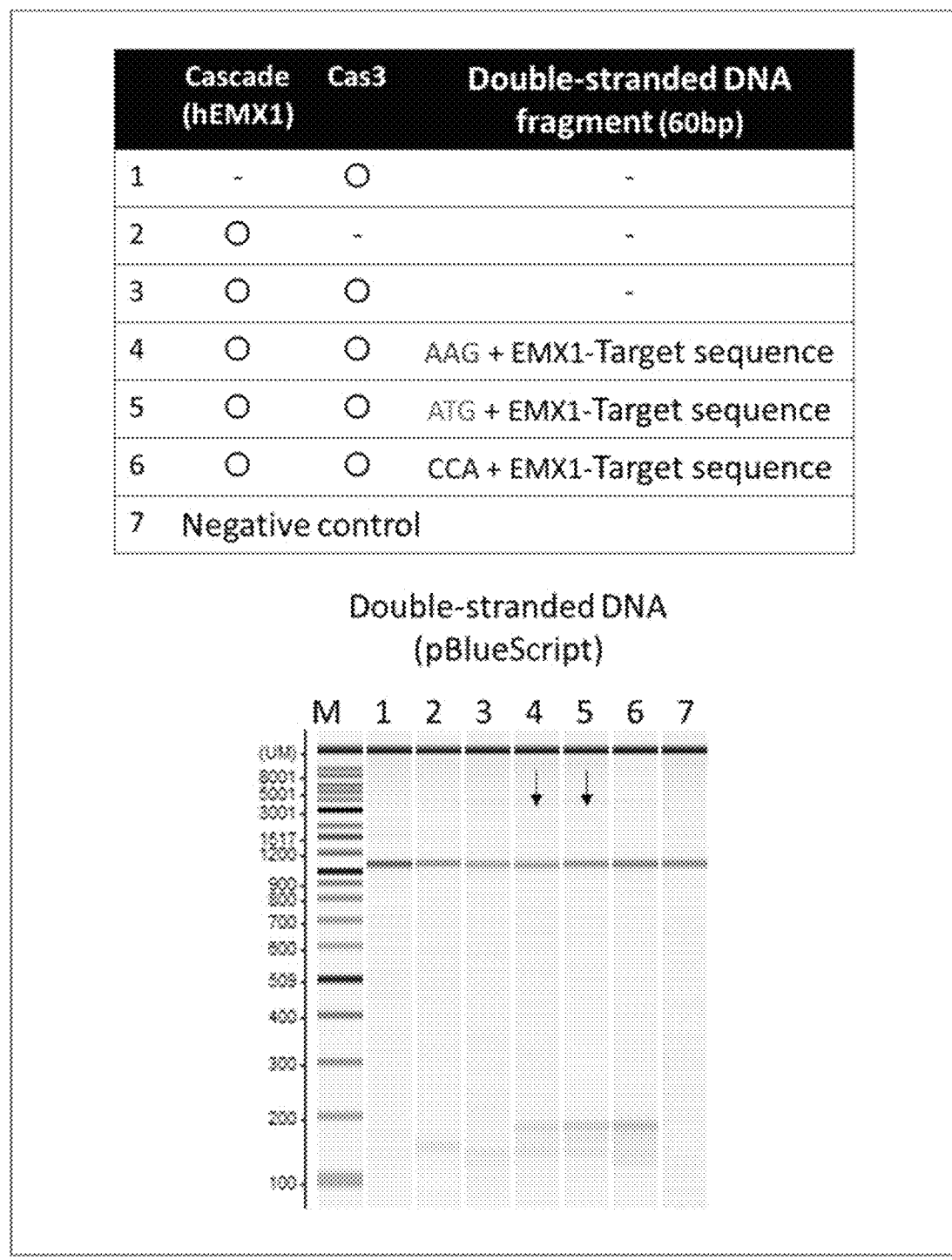
FIG. 2 is a diagram showing that the CRISPR-Cas3 system does not non-specifically cleave the double-stranded DNA even in the presence of the hEMX1 target sequence. The upper part of the diagram shows compositions of samples, and the lower part of the diagram shows the results of capillary electrophoresis. Non-specific double-stranded DNA cleavage activity was not observed also in samples 4 and 5 in which DNA fragments containing appropriate PAM sequence and target sequence were present (arrows).
Figure 3:
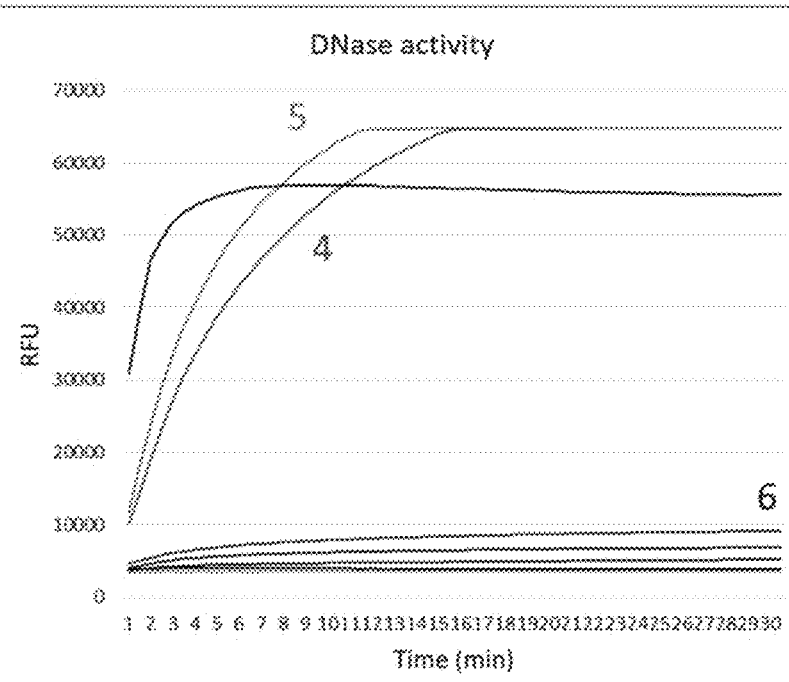
FIG. 3 is a diagram showing results of detecting that the CRISPR-Cas3 system non-specifically cleaved single-stranded DNA in the presence of hEMX1 target sequence by using a single-stranded DNA probe (DNaseAlert™) which emits fluorescence upon cleavage. The upper part of the diagram shows compositions of samples, and the lower part of the diagram shows the results of detecting fluorescence. Non-specific nuclease activity (fluorescence) with time was detected only in samples 4 and 5 in which DNA fragments containing appropriate PAM sequence and target sequence were present.
Figure 4:
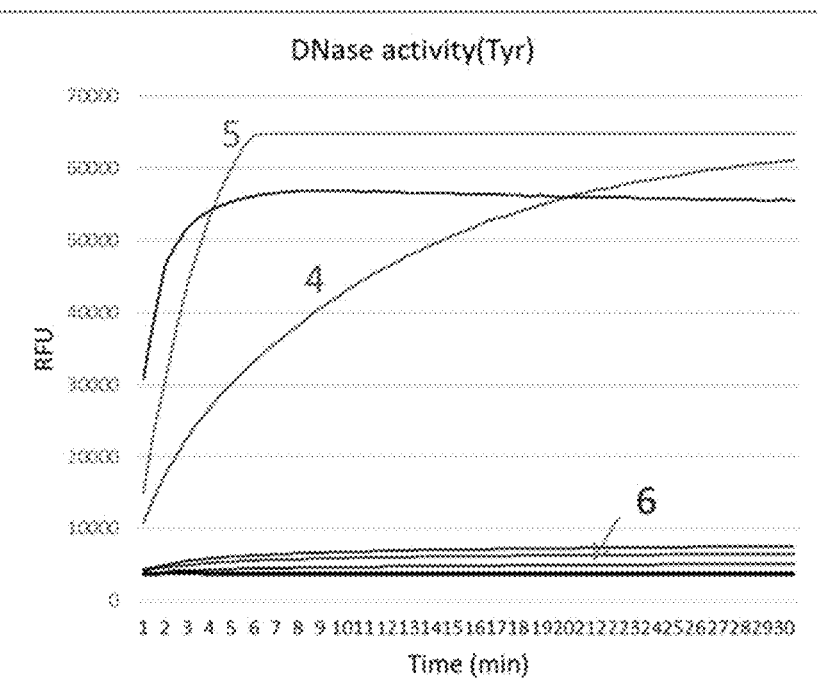
FIG. 4 is a diagram showing results of detecting that the CRISPR-Cas3 system non-specifically cleaved single-stranded DNA in the presence of mTyr target sequence by using a single-stranded DNA probe (DNaseAlert™) which emits fluorescence upon cleavage. The upper part of the diagram shows compositions of samples, and the lower part of the diagram shows the results of detecting fluorescence. Non-specific nuclease activity (fluorescence) with time was detected only in samples 4 and 5 in which DNA fragments containing appropriate PAM sequence and target sequence were present.
Figure 5A:
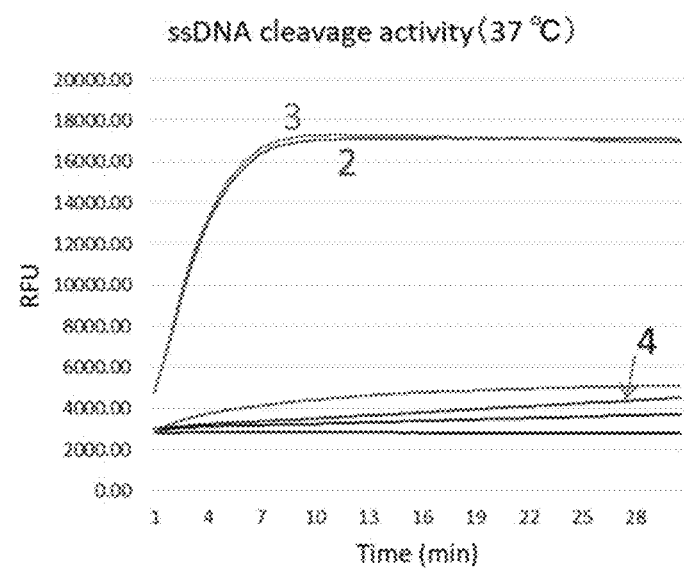
FIG. 5A is a diagram showing results of detecting that the CRISPR-Cas3 system non-specifically cleaved single-stranded DNA in the presence of hEMX1 target sequence by using a single-stranded DNA probe (Taqman™ probe) which emits fluorescence upon cleavage. The upper part of the diagram shows compositions of samples, and the lower part of the diagram shows the results of detecting fluorescence. Non-specific single-stranded DNA cleavage activity (fluorescence) with time was detected only in samples 2 and 3 in which DNA fragments containing appropriate PAM sequence and target sequence were present.
Figure 5B:
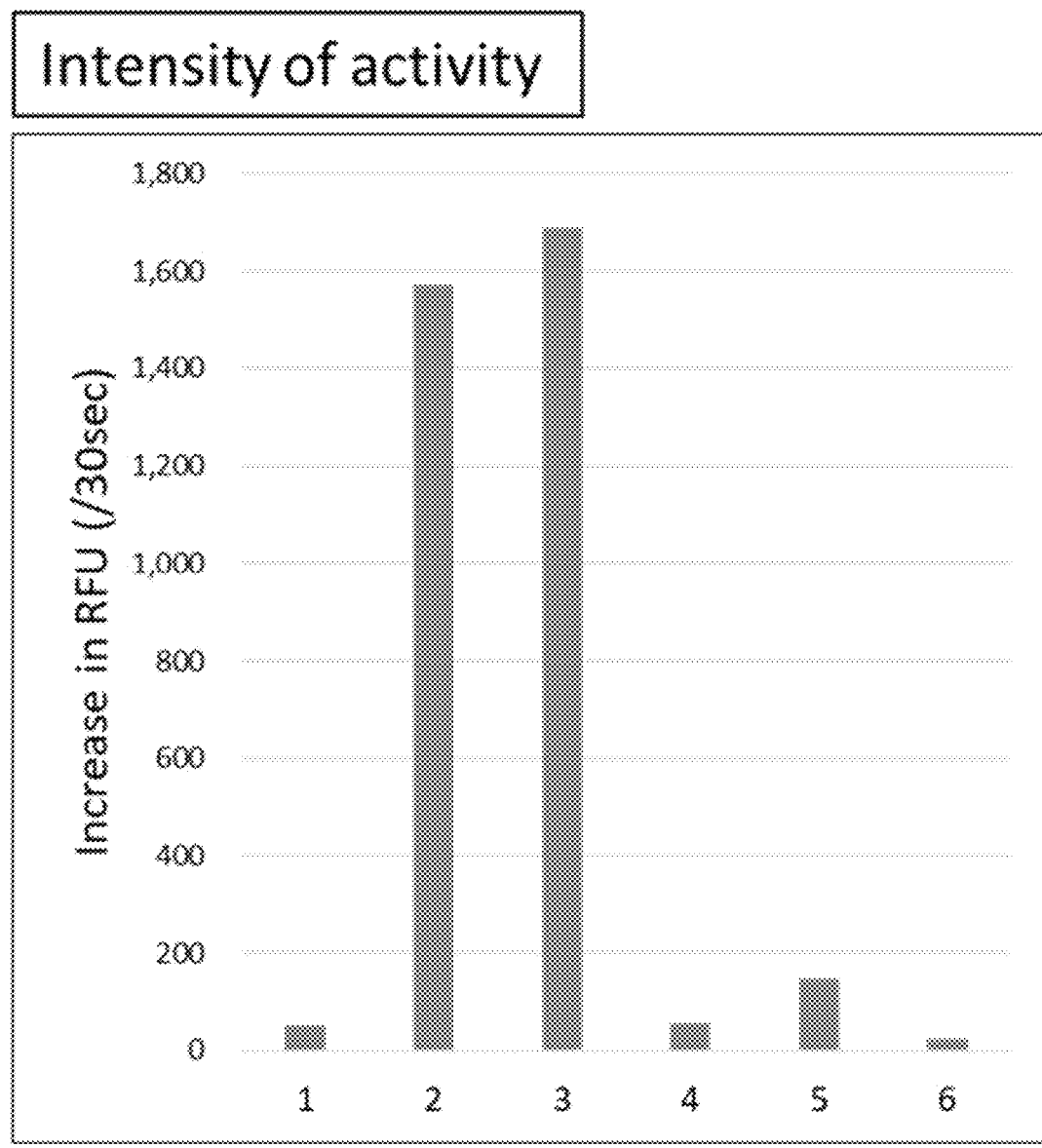
FIG. 5B is a graph representing the degree of increase in fluorescence intensity in FIG. 5A as the intensity of the activity.

<Method for Detecting Specific DNA in Sample>

The present invention provides a method for detecting a specific DNA in a sample utilizing the CRISPR-Cas3 system and a single-stranded probe DNA.

The detection method of the present invention comprises the steps of: (a) contacting the sample with a CRISPR-Cas3 system targeting the specific DNA and a single-stranded probe DNA; and (b) detecting cleavage of the single-stranded probe DNA by the CRISPR-Cas3 system that occurs in a case where the specific DNA is present in the sample.

—Target DNA—

In the detection method of the present invention, the specific DNA to be detected (hereinafter, referred to as "target DNA") is not particularly limited as long as the target DNA serves as a target of the CRISPR-Cas3 system. The target DNA may be a double-stranded DNA or may be a single-stranded DNA (see FIG. 6).

The source of the target DNA is not particularly limited, and the target DNA may be a DNA derived from the natural world or may be an artificial DNA. The DNA derived from the natural world includes, for example, DNAs derived from viruses (for example, animal viruses, plant viruses, and bacterial viruses), DNAs derived from prokaryotic organisms (for example, bacteria, actinomycetes, prokaryotic algae, and archaea), and DNAs derived from eukaryotic organisms (for example, animals, plants, eukaryotic algae, fungi, and protozoa).

An example of one preferable embodiment of the detection method of the present invention is diagnosis of viral infections. The virus from which the target DNA to be detected is derived is not particularly limited, and may be a DNA virus or may be an RNA virus. In the case of an RNA virus, the target DNA can be obtained by conducting reverse transcription on the RNA virus. Specific viruses include, for example, retroviruses, picornaviruses, caliciviruses, togaviruses, flaviviruses, coronaviruses (for example, novel coronavirus "SARS-CoV2"), rhabdoviruses, filoviruses, paramyxoviruses, orthomyxoviruses, bungaviruses, arenaviruses, reoviruses, birnaviruses, hepadnaviruses, parvoviruses, papovaviruses, adenovirus, herpesviruses, poxviruses, iridoviruses, geminiviruses, phycodnaviruses, and the like, but the virus is not limited to these.

An example of another preferable embodiment of the detection method of the present invention is diagnosis of pathogenic infections and protozoa infections. The pathogenic bacteria and the protozoa from which the target DNA to be detected is derived include, for example, *shigella*, *Salmonella Typhi*, *Salmonella*, pathogenic *Escherichia coli*, *Vibrio cholerae*, *Vibrios*, *Campylobacter*, *Clostridium welchii*, *Bacillus cereus*, *Yersinia*, *Staphylococcus aureus*, *Entamoeba histolytica*, *Leishmania*, *malaria*, *Trypanosoma*, *Toxoplasma gondii*, *Giardia lamblia*, *Trichomonas*, *Balantidium*, *Coccidia*, and the like, but the pathogenic bacteria or the protozoa are not limited to these.

An example of another preferable embodiment of the detection method of the present invention is diagnosis of mutation and polymorphism of genes. For example, it is known that the mutation of viral genes can be utilized as indication for drug resistance and the like of the virus. For example, I38T mutation (ATA→AGA) of the RNA polymerase gene (hereinafter, referred to as "PA gene") of type A influenza virus H1N1 and I38T mutation (ATA→ACA) of the PA gene of type A influenza virus H3N2 relate to the resistance to Xofluza, I222R mutation (ATA→AGA), H274Y mutation (CAC→TAC), and N294S mutation (AAC→AGC) of the neuraminidase gene (hereinafter, referred to as "NA gene") of type A influenza virus H1N1 as well as E119V mutation (GAA→GTA), R292K mutation (AGA→AAA), and N294S mutation (AAC→AGC) of the NA gene of type A influenza virus H3N2 relate to the resistance to Tamiflu and Relenza (Pizzorno et al., Front. Immunol., 2019 March 19, doi.10.3389/fimmu.2019.00531) . Hence, it is possible to evaluate the resistances to virus treatment drugs by detecting mutations of these viral genes by using the method of the present invention.

In addition, mutation and polymorphism (for example, single-nucleotide polymorphism) of genes of human and the like can be utilized, for example, as indication for the risk of development of diseases, the efficacies and the side effects of drugs, and the like.

Figure 8:
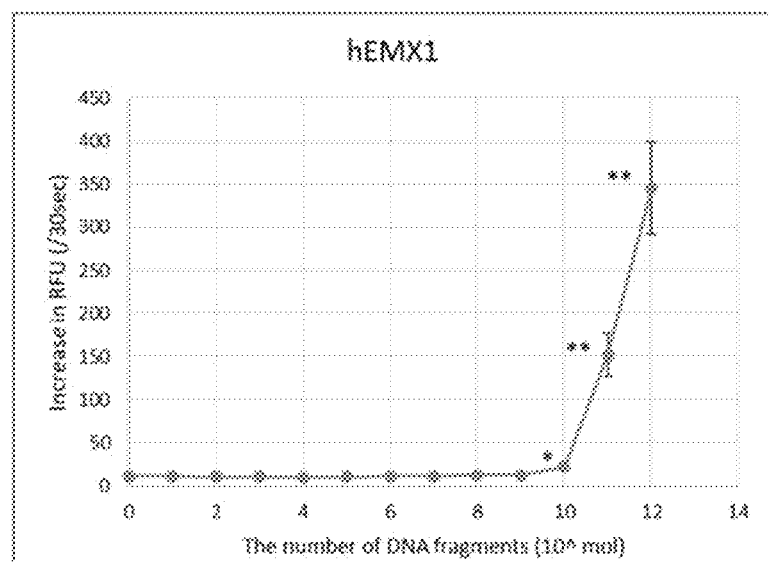
FIG. 8 is a diagram showing results of evaluating the detection limit concentration of the CRISPR-Cas3. DNA fragments containing target sequences (the upper part of the diagram is hEMX1, and the lower part of the diagram is mTyr) were diluted through limiting dilution, and the same experiment as in FIG. 5 was conducted. Signals were detected significantly in the presence of $1 \times 10^{10}$ copies or more. N=3.
Figure 8:
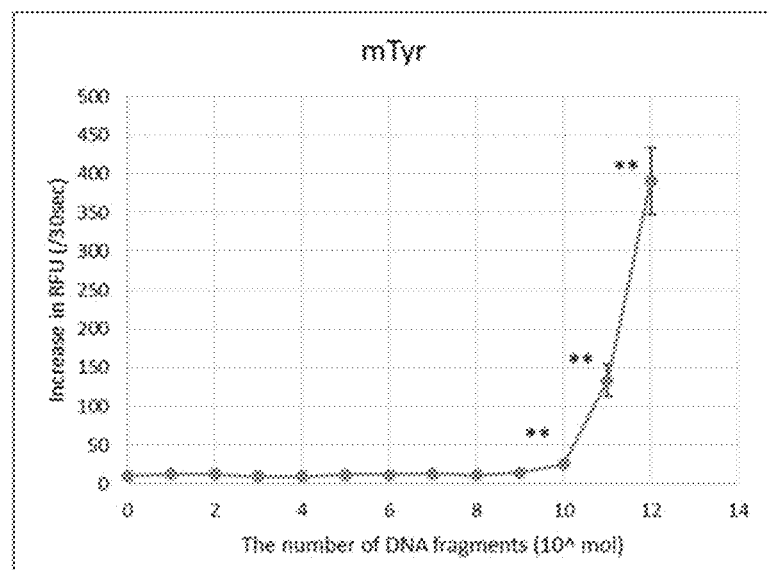

In the present invention, in a case where $10^{10}$ copies or more of the target DNA are present in a sample, it is possible to favorably detect the target DNA (see FIG. 8). However, even in a case where only 1 copy to 10 copies of the target DNA are contained in the initial sample, it is possible to detect the target DNA by amplifying the DNA in the sample (see FIGS. 9, 11, and 12).

The DNA in the sample can be amplified before the sample is contacted with the CRISPR-Cas3 system or during the contact. In addition, the amplification of DNA may be amplification specific to the target DNA (or a specific region thereof) or may be amplification oriented to the target DNA (or a specific region thereof).

The methods for amplifying DNA are known to a person skilled in the art, and various methods can be used. The methods include, for example, various PCR (polymerase chain reaction) methods (the PCR method, the RT-PCR method, the quantitative PCR method, and the like), the RPA (recombinase polymerase amplification) method, various LAMP (loop-mediated isothermal Amplification) methods (the LAMP method, the RT-RAMP method, the quantitative LAMP method, and the like), the HDA (heliCase-dependent Amplification) method, the SDA (strand displacement amplification) method, the NASBA (nucleic acid sequence-based amplification) method, the TMA (transcription mediated amplification) method, the NEAR (nicking enzyme amplification reaction) method, the MDA (multiple displacement amplification) method, the RAM (Ramification) method, and the like; however, the method is not limited to these.

—Test Sample—

As the sample in the detection method of the present invention, any desired sample for which the presence of a target DNA is desired to be detected (hereinafter, referred to as a "test sample") can be used. The test sample includes, for example, samples containing body fluids (urine, saliva, serum, plasma, whole blood, and the like), body tissues, cells, cell lysates, and purified or synthesized DNAs.

In the case where infections of viruses, pathogenic bacteria, or protozoa are diagnosed, the test samples may be derived from human patients, animals, plants, or the like suspected to have these infections, for example.

The animal from which the test sample is derived includes, for example, mammals, fishes, birds, reptiles, amphibians, and insects. The mammals are a concept that encompasses human and non-human mammals. Examples of non-human mammals include cloven-hoofed animals such as cattle, boars, pigs, sheep, and goats, odd-toed ungulates such as horses, rodents such as mice, rats, guinea pigs, hamsters, and squirrels, lagomorphs such as rabbits, carnivores such as dogs, cats, and ferrets, and the like. The non-human mammals may be livestock or companion animals (pets), or may be wild animals. The animal cells include, for example, cells constituting individuals of animals, cells constituting organs and tissues excised from animals, cultured cells derived from tissues of animals, and the like. Specifically, the animal cells include, for example, germ cells such as oocytes and sperm; embryonic cells of embryos at various stages (for example, 1-cell embryos, 2-cell embryos, 4-cell embryos, 8-cell embryos, 16-cell embryos, morula embryos, and the like); stem cells such as induced pluripotent stem (iPS) cells and embryonic stem (ES) cells; somatic cells such as fibroblasts, hematopoietic cells, neurons, muscle cells, bone cells, liver cells, pancreatic cells, brain cells, and kidney cells.

The plant from which the test samples are derived includes, for example, grains, oil crops, forage crops, fruits, and vegetables, and specifically include, for example, rice, corn, banana, peanut, sunflower, tomato, turnip rape, tobacco, wheat, barley, potato, soybean, cotton, carnation, and the like. The plant cells include, for example, cells constituting individuals of plants, cells constituting organs and tissues separated from plants, cultured cells derived from tissues of plants, and the like. The organs and tissues of plants include, for example, leaves, stems, shoot apexes (growing points), roots, tubers, calli, propagation material (for example, seeds, tuberous roots, tubers, and the like).

—CRISPR-Cas3 System—

The Class 1 CRISPR-Cas systems are classified into type I and type III, and type I is further classified into six types of type I-A, type I-B, type I-C, type I-D, type I-E, and type I-F as well as type I-G, which is a subtype of type I-B, depending on the types of proteins constituting the Cascade (hereinafter, simply referred to as "Cascade" or "Cascade protein") (for example, see [van der Oost J et al., Nature Reviews Microbiologym, 2014 12(7): 479-492], [Jackson R N et al., Current Opinion in Structural Biology, 2014 24: 106-114]).

The type I CRISPR-Cas systems have the function of cleaving DNA by using cooperation of Cas3 (protein having nuclease activity and helicase activity), Cascade, and crRNA. Since Cas3 is used as a nuclease, these are referred to as the "CRISPR-Cas3 system" in the present invention.

Use of the CRISPR-Cas3 system of the present invention makes it possible to obtain, for example, the following advantages.

First, the crRNA used in the CRISPR-Cas3 system generally recognizes a target sequence of 32 to 37 bases (Ming Li et al., Nucleic Acids Res. 2017 May 5; 45(8): 4642-4654). On the other hand, the crRNA used in the CRISPR-Cas9 system generally recognizes a target sequence of 18 to 24 bases. Therefore, it is considered that the CRISPR-Cas3 system can recognize target sequences more accurately than the CRISPR-Cas9 system.

In addition, the PAM sequence of the CRISPR-Cas9 system, which is the Class 2 type II system, is "NGG (N is an arbitrary base)" adjacent to the 3' side of the target sequence. In addition, the PAM sequence of the CRISPR-Cpf1 system, which is the Class 2 type V system, is "AA" adjacent to the 5' side of the target sequence. On the other hand, the PAM sequence of the CRISPR-Cas3 system of the present invention is "AAG" adjacent to the 5' side of the target sequence or a nucleic acid sequence similar to that (for example, "AGG", "GAG", "TAC", "ATG", "TAG", or the like). Thus, using the CRISPR-Cas3 system of the present invention makes it possible to target DNA regions which cannot be recognized by the conventional methods.

The CRISPR-Cas3 system of the present invention encompasses all the six subtypes of type I. That is, although proteins constituting the CRISPR-Cas3 system may differ slightly in constitution and the like depending on the subtypes (for example, proteins constituting the Cascade are different), the present invention encompasses all of these proteins. In addition, the CRISPR-Cas3 system of the present invention is independent from the types of bacteria as the source.

The type I-E CRISPR-Cas3 system, which is common among the type I CRISPR-Cas3 systems, cleaves DNA by making a crRNA cooperate with Cas3 and Cascade (Cse1 (Cas8), Cse2 (Cas11), Cas5, Cas6, and Cas7).

The type I-A system has Cas8a1, Csa5 (Cas11), Cas5, Cas6, and Cas7 as constituent elements of the Cascade, the type I-B has Cas8b1, Cas5, Cas6, and Cas7 as constituent elements of the Cascade, the type I-C has Cas8c, Cas5, and Cas7 as constituent elements of the Cascade, the type I-D has Cas10, Csc1 (Cas5), Cas6, and Csc2 (Cas7) as constituent elements of the Cascade, the type I-F has Csy1 (Cas8f), Csy2 (Cas5), Cas6, and Csy3 (Cas7) as constituent elements of the Cascade, and the type I-G system has Cst1 (Cas8a1), Cas5, Cas6, and Cst2 (Cas7) as constituent elements of the Cascade. In the present invention, Cas3 and Cascade are collectively referred to as the "Cas protein group".

Hereinafter, the type I-E CRISPR-Cas3 system will be described as a representative example. For the other types of CRISPR-Cas3 systems, the Cascade constituting the systems may be interpreted as appropriate.

—Cas Protein Group, Polynucleotide Encoding the Protein Group, Vector for Expressing the Polynucleotide—

In the detection method of the present invention, the Cas protein group can be used in the form of a protein, in the form of a polynucleotide encoding the protein, or in the form of an expression vector containing the polynucleotide.

Preferable embodiments of the respective proteins constituting the Cas protein group used in the present invention are the following proteins of wild type *E. coli*:

Cas3; a protein composed of a nucleic acid sequence set forth in SEQ ID NO: 1 (a protein encoded by a nucleic acid sequence set forth in SEQ ID NO: 7)

Cse1 (Cas8); a protein composed of a nucleic acid sequence set forth in SEQ ID NO: 2 (a protein encoded by a nucleic acid sequence set forth in SEQ ID NO: 8)

Cse2 (Cas11); a protein composed of a nucleic acid sequence set forth in SEQ ID NO: 3 (a protein encoded by a nucleic acid sequence set forth in SEQ ID NO: 9)

Cas5; a protein composed of a nucleic acid sequence set forth in SEQ ID NO: 4 (a protein encoded by a nucleic acid sequence set forth in SEQ ID NO: 10)

Cas6; a protein composed of a nucleic acid sequence set forth in SEQ ID NO: 5 (a protein encoded by a nucleic acid sequence set forth in SEQ ID NO: 11)

Cas7; a protein composed of a nucleic acid sequence set forth in SEQ ID NO: 6 (a protein encoded by a nucleic acid sequence set forth in SEQ ID NO: 12).

Another preferable embodiment of each above protein constituting the Cas protein group used in the present invention is a protein composed of an amino acid sequence obtained by substituting, deleting, adding, and/or inserting one or multiple amino acids in the amino acid sequence of the each protein. Here, "multiple" is normally 50 amino acids or less, preferably 30 amino acids or less, more preferably 20 amino acids or less, and particularly preferably 10 amino acids or less (for example, 5 amino acids or less, 3 amino acids or less, 2 amino acids or less, or 1 amino acid).

Another preferable embodiment of each above protein constituting the Cas protein group used in the present invention is a protein composed of an amino acid sequence having a high identity with the amino acid sequence of the each protein. The high identity means a sequence identity of, for example, 80% or more, preferably 85% or more, more preferably 90% or more (for example, 91% or more, 92% or more, 93% or more, or 94% or more), and further preferably 95% or more (for example, 96% or more, 97% or more, 98% or more, or 99% or more). The sequence identity can be determined by using BLAST (Basic Local Alignment Search Tool at the National Center for Biological Information of the United States) or the like (for example, by using parameters of the default, that is, the initial setting).

Another preferable embodiment of each protein constituting the Cas protein group used in the present invention is a protein encoded by a polynucleotide that hybridizes under stringent conditions to a polynucleotide composed of a nucleic acid sequence complementary to the nucleic acid sequence of each above protein.

Here, "stringent conditions" mean conditions under which two polynucleotide chains form a double-stranded polynucleotide specific to a nucleic acid sequence but do not form a non-specific double-stranded polynucleotide. The phrase "hybridizes under stringent conditions" may be rephrased to conditions under which a polynucleotide can hybridize within a temperature range from a melting temperature (Tm value) of nucleic acids having high sequence identity (for example, hybrids that completely match) to a temperature 15° C. lower, preferably a temperature 10° C. lower, and more preferably a temperature 5° C. lower, than the melting temperature.

The following is an example of the stringent conditions. In a buffer solution (pH 7.2) composed of 0.25M $Na_2HPO_4$, 7% SDS, 1 mM EDTA, and 1×Denhardt's solution, two types of polynucleotides are hybridized at 60 to 68° C. (preferably 65° C., and more preferably 68° C.) for 16 to 24 hours. Thereafter, in a buffer solution (pH 7.2) composed of 20 mM $Na_2HPO_4$, 1% SDS, and 1 mM EDTA, washing for 15 minutes is conducted at 60 to 68° C. (preferably 65° C., and more preferably 68° C.).

The following method is another example. First, in a hybridization solution containing 25% formamide (under more stringent conditions, 50% formamide), 4×SSC (sodium chloride/sodium citrate), 50 mM Hepes (pH 7.0), 10×Denhardt's solution, and 20 μg/mL denatured salmon sperm DNA, prehybridization is conducted at 42° C. overnight, then a labeled probe is added, and the temperature is maintained at 42° C. overnight to hybridization two types of polynucleotides.

Next, washing is conducted under any of the following conditions. Normal conditions; washing is conducted at around 37° C. using 1×SSC and 0.1% SDS as a cleaning liquid. Stringent conditions; washing is conducted at around 42° C. using 0.5×SSC and 0.1% SDS as a cleaning liquid. Further stringent conditions; washing is conducted at around 65° C. using 0.2×SSC and 0.1% SDS as a cleaning liquid.

In this way, the more stringent the washing conditions for hybridization are, the higher the specificity of the hybridization is. Note that the above combinations of conditions on SSC, SDS, and the temperatures are mere examples. Stringency similar to the above can be achieved by combining the above-described elements to determine the stringency of hybridization, or other elements (for example, the concentration of the probe, the length of the probe, reaction time of the hybridization, and the like) as appropriate. This is described in, for example, [Joseph Sambrook & David W. Russell, Molecular cloning: a laboratory manual 3rd Ed., New York: Cold Spring Harbor Laboratory Press, 2001] and the like.

When each of the above proteins forms a complex with another molecule constituting the CRISPR-Cas3 system to recognize a target DNA, the protein brings non-specific cleavage activity of a single-stranded DNA to the complex (see Examples).

To each of the proteins constituting the above Cas protein groups, functional molecules may be further added, as necessary. The functional molecule includes, for example, nuclear localization signals for accelerating the transition into the nucleus of the eukaryotic cell, tags for facilitating the purification, reporter proteins for facilitating the detection, and the like, but is not limited to these. These functional molecules can be added, for example, to the N terminal side and/or the C terminal of each protein constituting the Cas protein group.

The nuclear localization signals include, for example, PKKKRKV (SEQ ID NO: 13), KRTADGSEF-ESPKKKRKVE (SEQ ID NO: 14), and the like. The tags include, for example, a polyhistidine-tag, a FLAG-tag, glutathione-S-transferase (GST), and the like. The reporter proteins include, for example, fluorescent proteins such as a green fluorescent protein (GFP), chemiluminescent proteins such as luciferase, and the like.

In the present invention, a polynucleotide encoding the Cas protein group can be used, and preferable embodiments thereof are as follows:

Cas3; a polynucleotide composed of a nucleic acid sequence set forth in SEQ ID NO: 7
Cse1 (Cas8); a polynucleotide composed of a nucleic acid sequence set forth in SEQ ID NO: 8
Cse2 (Cas11); a polynucleotide composed of a nucleic acid sequence set forth in SEQ ID NO: 9
Cas5; a polynucleotide composed of a nucleic acid sequence set forth in SEQ ID NO: 10
Cas6; a polynucleotide composed of a nucleic acid sequence set forth in SEQ ID NO: 11
Cas7; a polynucleotide composed of a nucleic acid sequence set forth in SEQ ID NO: 12

These are polynucleotides encoding the wild type Cas protein group of *E. coli*, but artificially modified polynucleotides can be used depending on the purpose. The artificial modification of polynucleotides includes, for example, modification to a nucleic acid sequence suitable for expression in a host cell or an in vitro expression system (for example, optimization of codons).

In the present invention, expression vectors for expressing the Cas protein group can be used. As the expression vector, various publicly-known vectors can be used. The expression vectors include, for example, phage vectors, plasmid vectors, virus vectors, retrovirus vectors, chromosome vectors, episome vectors, and virus-derived vectors (bacterial plasmids, bacteriophages, yeast episomes, and the like), yeast chromosomal elements, and viruses (baculoviruses, papova viruses, vaccinia viruses, adenovirus, tripox viruses, pseudorabies viruses, herpesviruses, lentiviruses, retroviruses, and the like), and vectors derived from combinations of these (cosmids, phagemids, and the like).

Preferably, the expression vector further contains sites for transcription initiation and transcription termination as well as a ribosome binding site in the transcription region. The coding site of the mature transcript in the vector contains the transcription initiation codon AUG at the beginning of the polypeptide to be translated and an appropriately located termination codon at the end of the polypeptide.

In the present invention, the expression vector for expressing the Cas protein group may contain a promoter sequence. The promoter sequence may be appropriately selected depending on the location of the gene expression (for example, type of the host). In addition, the expression vector may contain a sequence for enhancing transcription from DNA, for example, an enhancer sequence. The enhancer includes, for example, the SV40 enhancer (which is arranged at 100 to 270 bp downstream of the replication origin), the early promoter enhancer of the cytomegalovirus, the polyoma enhancer and the adenovirus enhancer arranged downstream of the replication origin. In addition, the expression vector may contain a sequence for stabilizing transcribed RNA, for example, a poly(A) addition sequence (polyadenylated sequence, polyA). Examples of the poly(A) addition sequence include poly(A) addition sequences derived from the growth hormone gene, poly(A) addition sequences derived from the bovine growth hormone gene, poly(A) addition sequences derived from the human growth hormone gene, poly(A) addition sequences derived from SV40 virus, and poly(A) addition sequences derived from the β-globin gene of human or rabbit.

It is possible to design the polynucleotides encoding the Cas protein groups to be mounted on a single (the same) vector, and it is also possible to design all or part of the polynucleotides encoding the respective Cas protein groups to be mounted on separate vectors. For example, it is possible to employ a design that the polynucleotides encoding the Cascade protein are mounted on a single (the same) vector and the polynucleotides encoding Cas3 are mounted on different vectors.

In addition, it is possible to use an expression vector which contains multiple nucleic acid sequences encoding the Cas protein groups and which has nucleic acid sequences that are inserted between the multiple nucleic acid sequences and that encode amino acid sequences (2A peptides and the like) to be cleaved by intracellular proteases. When polynucleotides having such nucleic acid sequences are transcribed and translated, polypeptide chains linked together in the cell are expressed. Thereafter, due to the action of intracellular proteases, the Cas protein groups are separated, become separate proteins, and then form complexes to function. This makes it possible to regulate the amount ratio of Cas protein groups to be expressed.

The expression vector used in the present invention can be prepared in accordance with a publicly-known method. Such a method includes the method described in the implementation manuals attached to kits for preparing vectors as well as methods described in various handbooks. For example, [Joseph Sambrook & David W. Russell, Molecular cloning: a laboratory manual 3rd Ed., New York: Cold Spring Harbor Laboratory Press, 2001] is a comprehensive handbook.

—crRNA, Polynucleotide Encoding the crRNA, or Expression Vector Containing the Polynucleotide—

The CRISPR-Cas3 system used in the present invention contains crRNA, a polynucleotide encoding the crRNA, or an expression vector containing the polynucleotide, for targeting to a specific DNA.

crRNA is RNA that forms part of the CRISPR-Cas system, and has a nucleic acid sequence complementary to the target sequence in the target DNA. The CRISPR-Cas3 system makes it possible for the crRNA to specifically recognize the target sequence and to cleave the sequence.

In the case where the functional complex of the CRISPR-Cas3 system is formed in cells, it is preferable to use a pre-crRNA as the crRNA (WO 2018/225858 A).

The pre-crRNA typically has a structure of "leader sequence-repeated sequence-spacer sequence-repeated sequence (LRSR structure)" or "repeated sequence-spacer sequence-repeated sequence (RSR structure)". The leader sequence is an AT-rich sequence and functions as a promoter to express the pre-crRNA. The repeated sequence is a sequence repeating with a spacer sequence in between, and the spacer sequence is a sequence designed as a sequence complementary to the target sequence in the target DNA (originally, it is a sequence derived from a foreign DNA incorporated in the course of adaptation). The pre-crRNA becomes a mature crRNA when cleaved by proteins constituting the Cascade (for example, Cas6 for type I-A, B, D to E, and Cas5 for type I-C).

Typically, the chain length of the leader sequence is 86 bases, and the chain length of the repeated sequence is 29 bases. The chain length of the spacer sequence is, for example, 10 to 60 bases, preferably 20 to 50 bases, more preferably 25 to 40 bases, and typically 32 to 37 bases. Hence, in the case of the LRSR structure, the chain length of the pre-crRNA used in the present invention is, for example, 154 to 204 bases, preferably 164 to 194 bases, more preferably 169 to 184 bases, and typically, 176 to 181 bases. In addition, in the case of the RSR structure, the chain length of the pre-crRNA is, for example, 68 to 118 bases, preferably 78 to 108 bases, more preferably 83 to 98 bases, and typically, 90 to 95 bases.

In order to make the complex of the CRISPR-Cas3 system be formed and function in cells, it is considered that the process by which the repeated sequences of the pre-crRNA is cleaved by the proteins constituting the Cascade is important. Thus, it should be understood that the repeated sequence may be shorter or longer than the above chain length as long as such cleavage takes place. That is, it can be said that the pre-crRNA is crRNA formed by adding sequences sufficient for cleavage by proteins constituting the Cascade to both ends of the mature crRNA described below.

On the other hand, the mature crRNA generated by cleavage of the pre-crRNA has a structure of "5' handle sequence-spacer sequence-3' handle sequence". Typically, the 5' handle sequence is composed of 8 bases from the 22nd to 29th of the repeated sequence and is held in Cas5. In addition, typically, the 3' handle sequence is composed of 21 bases from the 1st to 21st of the repeated sequence, forms a stem loop structure with the 6th to 21st bases, and is held in Cas6. Hence, the chain length of the mature crRNA is normally 61 to 66 bases. However, depending on the type of the CRISPR-Cas3 system, there are mature crRNAs that do not have 3' handle sequences. In this case, the chain length is 21 bases shorter.

Note that the sequence of RNA may be designed as appropriate depending on the target sequence. In addition, RNA can be synthesized by using any method known in the art.

—Single-Stranded Probe DNA—

The single-stranded probe DNA used in the detection method of the present invention is not particularly limited as long as the cleavage of the single-stranded probe DNA can be detected. The single-stranded probe DNA may be linear or may be cyclic, but is preferably linear (see FIG. 1). Nucleic acids constituting the single-stranded probe DNA may contain one or more modifications (for example, base modification, backbone modification, or sugar modification).

One preferable embodiment of the label bound to the single-stranded probe DNA is a fluorescent dye/quencher pair. In this embodiment, in a state where the fluorescent dye/quencher pair is bound and close to the single-stranded probe DNA, a signal from the fluorescent dye is reduced or eliminated. When the single-stranded probe DNA is cleaved and the fluorescent dye is separated from the quencher, sufficient signals from the fluorescent dye are detected. Hence, it is possible to detect the target DNA in a test sample by using, as indication, the fluorescence signal generated from the single-stranded probe DNA cleaved by the CRISPR-Cas3 system that has recognized and bound to the target DNA.

The binding of the fluorescent dye and quencher to the single-stranded probe DNA is not particularly limited as long as they are close enough to cause quenching and when the single-stranded probe DNA is cleaved, they are separated. For example, it is possible to bind the fluorescent dye to one of the terminals of the single-stranded probe DNA and the quencher to the other terminal. In order to enhance the quenching action in the probe, another quencher may be bound. In this case, a double-quencher probe in which an additional quencher (internal quencher) is bound to the inside of the single-stranded probe DNA may be used.

The fluorescent dye used in the fluorescent dye/quencher pair includes, for example, ATTO dyes, cyanine dyes (for example, Cy3 and Cy5), tetramethylrhodamine (for example, TRITC), carboxyfluorescein (FAM), tetrachlorofluorescein (TET) hexachlorofluorescein (HEX), Texas Red, Yakima Yellow, and the like, and specific examples of the quencher include, for example, dark quencher, BHQ (Black Hole Quencher), IBFQ (Iowa Blak FQ), IBRQ (Iowa Blak RQ), Eclipse, and the like, but the fluorescent dye and the quencher are not limited to these. As the internal quencher, for example, ZEN and TAO can be favorably used. The use of a fluorescent dye/quencher pair for detecting cleavage of probe DNA is known to a person skilled in the art (for example, see International Publication No. WO2019/104058 (WO 2019/104058 A)).

Another preferable embodiment of the label bound to the single-stranded probe DNA is a donor/acceptor pair for fluorescence resonance energy transfer (FRET). In this embodiment, in a state where the donor/acceptor pair is bound and close to the single-stranded probe DNA, excitation of the donor causes excitation and luminescence of the acceptor (that is, a FRET signal is generated). When the single-stranded probe DNA is cleaved and the donor and the acceptor are separated, the FRET signal is reduced or eliminated. Hence, it is possible to detect the target DNA in the test sample by using, as indication, reduction or elimination of the FRET signal in the single-stranded probe DNA cleaved by the CRISPR-Cas3 system that has recognized and bound to the target DNA.

The binding of the donor and the acceptor for FRET to the single-stranded probe DNA is not particularly limited as long as they are close enough to cause FRET and when the single-stranded probe DNA is cleaved, they are separated. For example, it is possible to bind the donor to one of the terminals of the single-stranded probe DNA and the acceptor to the other terminal.

The donor/acceptor pair for FRET includes, for example, BFP/eGFP, BFP/YFP, BFP/DsRed2, CFP/YFP, CFP/DsRed2, Midoriishi-Cyan/Kurabira-Orange, eGFP/DsRed, eGFP/Rhod-2, FITC/TRITC, FITC/Rhod-2, FITC/Cy3, Alexa488/Alexa546, Alexa488/Alexa555, Alexa488/Cy3, YFP/TRITC, YFP/Cy3, Cy3/Cy5, Cy3/Cy5.5, fluorescein/tetramethylrhodamine, IAEDANS/FITC, IAEDANS/5-(iodoacetamide)fluorescein, fluorescein/fluorescein, EDANS/dansyl, tryptophan/dansyl, tryptophan/pyrene, dansyl/fluorescein, naphthalene/dansyl, pyrene/coumarin, phycoerythrin/Cy5, and the like, but is not limited to these. The use of a donor/acceptor pair for detecting cleavage of probe DNA is known to a person skilled in the art (for example, see WO 2019/104058 A).

In addition the detection method of the present invention using a single-stranded probe DNA can be applied to immunochromatography (lateral flow assay). In this embodiment, for example, a single-stranded probe DNA to which a first tag and a second tag are bound is used, and an antibody for a labeled second tag (hereinafter, referred to as "labeled antibody") is used as a labeled body for capturing the single-stranded probe DNA to which the tags are bound. A molecule binding to the first tag and a molecule binding to the labeled antibody are fixed respectively to a first line of a strip for immunochromatography (line upstream in the strip) and a second line thereof (line downstream in the strip).

In this immunochromatography, in the case where the target DNA is not present in the sample, a complex of the single-stranded probe DNA and the labeled antibody is formed by means of the second tag of the single-stranded probe DNA (not cleaved), and the complex is captured by a molecule binding to the first tag fixed to the first line by means of the first tag of the single-stranded probe DNA (not cleaved), and thus a signal generated from the labeled antibody is detected on the first line.

On the other hand, in the case where the target DNA is present in the sample, the first tag and the second tag are separated by the cleavage of the single-stranded probe DNA. A complex of the second tag thus separated and the labeled antibody is formed, and the complex is captured on the second line by a molecule binding to the labeled antibody fixed to the second line, and thus a signal generated from the labeled antibody is detected on the second line. The complex of the second tag and the labeled antibody is not holding the first tag and is not captured on the first line, and thus no signal is detected on the first line.

The binding of the first tag and the second tag to the single-stranded probe DNA is not particularly limited as long as the tags are separated when the single-stranded probe DNA is cleaved. For example, it is possible to bind the first tag to one of the terminals of the single-stranded probe DNA and the second tag to the other terminal.

The first tag and the molecule binding thereto include, for example, a combination of streptavidin and biotin. The second tag includes, for example, FITC. The label in the labeled antibody includes, for example, gold particles. The molecule binding to the labeled antibody includes, for example, protein A and a secondary antibody (an antibody binding to the labeled antibody). The principle of the detection of the cleavage of the single-stranded probe DNA using immunochromatography is known to a person skilled in the art (Gootenberg et al., Science 2018; 360: 439-444). As the test strip in the immunochromatography, a commercial product (for example, HybriDetect (Milenia Biotec GmbH)) can also be used.

In the detection of the cleavage of the single-stranded probe DNA, various methods other than that described above can be used (for example, see WO 2019/104058 A).

—Contact of Test Sample, CRISPR-Cas3 System, and Single-Stranded Probe DNA—

The test sample, the CRISPR-Cas3 system, and the single-stranded probe DNA in the detection method of the present invention can be contacted by mixing the test sample, the CRISPR-Cas3 system, and the single-stranded probe DNA, for example. In the case where the test sample contains cells, a further operation for introducing the CRISPR-Cas3 system and the single-stranded probe DNA into the cells in the test sample can be included.

In the contacting of the test sample and the CRISPR-Cas3 system, it is possible to individually separate the crRNA and the Cas protein group and contact these with the test sample, or to prepare a complex of the crRNA and the Cas protein group in advance and contact the complex with the test sample. In the case where the CRISPR-Cas3 system is introduced into cells in the test sample, the crRNA and/or the Cas protein group may be expressed in the cells.

As the method for introducing the molecules constituting the CRISPR-Cas3 system into cells in the form of polynucleotide or an expression vector containing the polynucleotide, a publicly-known method such as an electroporation method, a calcium phosphate method, a liposome method, a DEAE dextran method, a microinjection method, cationic lipid-mediated transfection, electroporation, transduction, or infection using virus vectors can be used, for example. As the method for introducing molecules constituting the CRISPR-Cas3 system into cells in the form of proteins (or, a ribonucleoprotein complex), a publicly-known method such as microinjection, electroporation, or cationic lipid-mediated transfection can be used, for example. Such methods are described in many standard laboratory manuals such as "Leonard G. Davis et al., Basic methods in molecular biology, New York: Elsevier, 1986".

<Kit for Detecting Specific DNA in Sample>

A kit for detecting a specific DNA in a sample in the present invention comprises: (a) a CRISPR-Cas3 system targeting the specific DNA; and (b) a single-stranded probe DNA. The constituent elements of the kit of the present invention may be in a form in which they are separate from one another or in a form in which all or some of these are mixed.

In addition, the kit of the present invention may further contain, for example, a reference sample (each concentration), a control sample, a sample diluent, a reaction buffer solution, a cleaning liquid, and the like depending on the embodiment of the detection method. In addition, the kit of the present invention may further contain, for example, a molecule binding to a label (for example, a tag) (for example, a labeled antibody binding to the tag), a reagent necessary for detecting the label, and the like, depending on the type of the label in the single-stranded probe DNA. Moreover, the kit of the present invention may contain an instruction manual.

EXAMPLES

The present invention will be described in further detail based on Examples, but the present invention is not limited to the following Examples.

A. Materials and Methods (1) Preparation of Cas3 and Cascade Protein

In the present detection system, type I-E CRISPR derived from *E. coli* was used. The Cas3 proteins were purified using insect cells Sf9. A Cas3 sequence with a His-tagged nuclear localization signal (bpNLS) was incorporated into a Baculovirus gene expression vector, and then baculoviruses were prepared using *E. coli* strain DH10bac. The baculoviruses thus prepared were caused to infect the insect cells Sf9 to express the Cas3 proteins. Thereafter, all the proteins were collected, and the Cas3 proteins were purified using nickel column and gel filtration purification. In the preparation of Cascade complexes with NLS containing crRNA, three types of His-tagged Cas11 expression plasmids (pCDFDuet-1), Cas5, Cas6, Cas7, Cas8, and Cas11 expression plasmids (pRSFDuet-1), and target crRNA expression plasmids (pA-CYCDuet-1) were prepared, all of which were introduced into *E. coli* BL21 and expressed. After all the proteins were collected, the Cascade complexes were purified using nickel column and gel filtration purification.

Note that as the target sequences, a sequence in human EMX1 gene (TGGCGCATTGCCACGNNNCAGGCCAA-TGGGGAGGACATCGATGTCACCTCCAA TGACTAG/ SEQ ID NO: 15) and a sequence in mouse Tyr gene (GCATTACTATGTGTCNNNGGACACACTGCTTGG-GGGCTCTGAAATATGGAGGG ACATTGA/SEQ ID NO: 16) were used. "NNN" was the PAM sequence used in each experiment. In addition, the sequences of the Cas protein groups are shown in SEQ ID NOs: 1 to 12 and the sequence of the nuclear localization signal (bpNLS) is shown in SEQ ID NO: 14.

(2) Measurement of Non-Specific Cleavage Using Electrophoresis

Into a reaction buffer (5 mM HEPES-K pH 7.5, 60 mM KCl, 10 mM MgCl$_2$, 10 µM CoCl$_2$, and 2.5 mM ATP), Cas3 protein (5 ng/µL), Cascade complex (25 ng/µL), double-stranded DNA fragment containing the target sequence (2 ng/µL), and donor DNA for checking non-specific cleavage (4.5 ng/µL) were mixed. This reaction solution was incubated at 37° C. for 1 hour, and electrophoresis was conducted using a capillary electrophoresis apparatus "MultiNa" (Shimadzu Corporation). As the PAM sequences of the double-stranded DNA fragment, in addition to "AAG" and "ATG" which were recognizable by the CRISPR-Cas3 system, "CCA" which was not recognizable by the CRISPR-Cas3 system was used, and each was studied. As the donor DNAs, about 1 kb of linear single-stranded DNA, about 7 kb of cyclic single-stranded DNA (M13mp18 DNA), and about 3 kb of cyclic double-stranded DNA (pBlueScript) were used, and the cleavage activity of each by the CRISPR-Cas3 system was studied.

(3) Measurement of Nuclease Activity Using DNaseAlert™

In order to detect non-specific cleavages by using fluorescent probes, measurement of non-specific cleavages was conducted by using DNaseAlert™ Kit (IDT, Inc.). Into a reaction buffer (5 mM HEPES-K pH 7.5, 60 mM KCl, 10 mM MgCl$_2$, 10 PM CoCl$_2$, and 2.5 mM ATP), Cas3 protein (20 ng/µL), Cascade complex (32 ng/µL), double-stranded DNA fragment containing target sequence (2 ng/µL) were mixed. Into a substrate tube of DNaseAlert, 5 µL of Nuclease free water and 10×Alert Buffer were added to prepare a substrate solution. Then, 20 µL of the sample and 5 µL of the substrate solution (fluorescent probe solution) were mixed, and the intensity of HEX signals was observed with time using a real-time PCR apparatus at 37° C. every 30 seconds.

(4) Measurement of Nuclease Activity Using Taqman™ Probe

In order to detect non-specific cleavages by using a fluorescent probe of single-stranded DNA, non-specific cleavage were measured by using Taqman™ probe (sequence information: HEX-AAGGTCGGA-ZEN-GT-CAACGGATTTGGTC-IBFQ/SEQ ID NO: 17; Thermo Fisher Science). Into a reaction buffer (5 mM HEPES-K pH 7.5, 60 mM KCl, 10 mM MgCl$_2$, 10 µM CoCl$_2$, and 2.5 mM ATP), Cas3 protein (20 ng/µL), Cascade complex (32 ng/µL), double-stranded DNA fragment or single-stranded DNA fragment containing the target sequence (2 ng/µL) were mixed. After 0.5 µL of Taqman™ probe was prepared using 5 µL of Nuclease free water and 10×Alert Buffer, 20 µL of the sample and 5 µL of the substrate solution were mixed, and the intensity of HEX signals was observed with time using the real-time PCR apparatus (CFX Connect, Bio-Rad Laboratories, Inc.) at 37° C. every 30 seconds.

(5) Evaluation of Target Specificity of PAM Sequence

Samples were prepared by changing the PAM sequences (3 bases) of the double-stranded DNA fragments to all sequence patterns (64 types), and the non-specific cleavage activity using Taqman™ probe was measured in the same manner as in (4). The speeds of increase in fluorescence signal 1 minute after the start of the reaction were calculated, and the calculated values were compared to evaluate the intensity of the activity from differences in target recognition of the PAM sequences.

(6) Measurement of Detection Limit Concentration (i) Measurement in Double-Stranded DNA Fragment Solution The concentration of the double-stranded DNA fragment was adjusted through serial dilution, and the intensity of the activity in each concentration was measured by using Taqman™ probe in the same manner as in (4). In addition, the RPA method using TwistAmp Basic kit (TwistDx Inc.) was conducted on the diluted DNA sample under incubation conditions of 37° C. and 20 minutes to amplify DNA in the sample, and then the intensity of the activity was measured again.

(ii) Measurement in Genome-Mixed Solution

To a DNA solution obtained by diluting the concentration of the double-stranded DNA fragment through serial dilution, 20 ng of a mouse genome was mixed as a non-specific DNA to prepare a genome-mixed solution. Then, the RPA method using TwistAmp Basic kit (TwistDx Inc.) was conducted under incubation conditions of 37° C. and 20 minutes to amplify DNA in the sample. Then, the intensity of the activity in each concentration was measured using Taqman™ probe in the same manner as in (4).

(7) Detection of Novel Coronavirus RNA

A SARS-specific Cascade complex for use in detection was prepared, targeting the N gene of the novel coronavirus (SARS-CoV2). As the novel coronavirus RNA, a novel coronavirus RNA obtained by purifying the viruses, which was proliferated using the VeroE6/TMPRSS2 cell line, by using the QIAamp Viral RNA Mini Kit (QIAGEN) was used. After the virus RNA solution was serially diluted, the RT-LAMP method using the WarmStart LAMP Kit (NEB Inc.) was conducted under incubation conditions of 62° C. and 30 minutes to amplify the virus genome. Into 18 µl of a reaction buffer (5 mM HEPES-K pH 7.5, 60 mM KCl, 10 mM MgCl$_2$, 10 µM CoCl$_2$, 2.5 mM ATP, 400 nM Cas3 protein, 100 nM Cascade complex, and 250 nM Tagman™ probe), 2 µl of the virus genome-amplified solution was mixed, and the intensity of the activity in each concentration was measured by using the real-time PCR. The primer set used in the target amplification was designed using the PrimerExplorerV5 (https://primerexplorer.jp/lampv5/index.html).

Note that the virus-specific target sequences are as follows:

```
SARS-N1:
                                   SEQ ID NO: 18
aaggccaaactgtcactaagaaatctgctgctgag/

SARS-N2:
                                   SEQ ID NO: 19
aaggaactgattacaaacattggccgcaaattgca/.
```

In addition, the primers used in the RT-RAMP method are as follows:

```
<SARS-N1 Set>
SARS-NI-FIP:
                                   SEQ ID NO: 20
GTTGGCCTTTACCAGACATTTTGGTGATGCTGCTCTTGCTT/

SARS-N1-BIP:
                                   SEQ ID NO: 21
TGCTGAGGCTTCTAAGAAGCCAGCTTGTGTTACATTGTATGC/

SARS-N1-F3:
                                   SEQ ID NO: 22
ACTTCTCCTGCTAGAATGG/

SARS-N1-B3:
                                   SEQ ID NO: 23
GTTTGTTCTGGACCACGT/

SARS-N1-LF:
                                   SEQ ID NO: 24
TTCAATCTGTCAAGCAGCAGCA/

SARS-N1-LB:
                                   SEQ ID NO: 25
GGCAAAAACGTACTGCCACTA/.

<SARS-N2 Set>
SARS-N2-FIP:
                                   SEQ ID NO: 26
TCTGATTAGTTCCTGGTCCCCAAAGCATACAATGTAACACAAGC/

SARS-N2-BIP:
                                   SEQ ID NO: 27
CGCATTGGCATGGAAGTCACTTTGATGGCACCTGTGTAG/

SARS-N2-F3:
                                   SEQ ID NO: 28
GCAAAAACGTACTGCCAC/

SARS-N2-B3:
                                   SEQ ID NO: 29
GAAATTTGGATCTTTGTCATCC/

SARS-N2-LF:
                                   SEQ ID NO: 30
TGGACCACGTCTGCCGA/

SARS-N2-LB:
                                   SEQ ID NO: 31
ACCTTCGGGAACGTGGTT/
```

(8) Detection Using Lateral Flow Test Strip

In order to visualize signal in lateral flow test strips, the synthesis of a signal probe labeled with FITC and biotin (FITC-GTCAACGGATTTGGTC-BIO/SEQ ID NO: 32) was synthesized by outsourcing the synthesis to FASMAC. Into 18 µl of a reaction buffer (5 mM HEPES-K pH 7.5, 60 mM KCl, 10 mM MgCl$_2$, 10 µM CoCl$_2$, 2.5 mM ATP, 400 nM Cas3 protein, 200 nM Cascade complex, and 100 nM probe), 2 µl of the above virus genome-amplified solution was mixed and incubated at 37° C. for 10 minutes. After 50 µl of water was added, one end (on the control line side) of a test strip of HybriDetect (Milenia Biotec GmbH) was immersed into the reaction buffer, and left to stand at room temperature for 2 minutes, followed by detection.

(9) Detection of Sequences of Drug-Resistant Mutant Influenza Viruses

In order to detect single nucleotide mutations of drug-resistant mutant influenza viruses, target sequences of crRNAs was designed for mutated portions resistant to a baloxavir marboxil drug and a neuraminidase inhibitor, and a Cascade complex containing the crRNA was prepared. Then, 20 µl of a mixture liquid of a double-stranded DNA fragment solution (40 ng/µl) containing a wild-type sequence and a mutated sequence and a reaction buffer (5 mM HEPES-K pH 7.5, 60 mM KCl, 10 mM MgCl$_2$, 10 PM CoCl$_2$, 2.5 mM ATP, 400 nM Cas3 protein, 100 nM Cascade complex, and 250 nM Taqman™ probe) was prepared, and the intensity of the activity was measured using a real-time PCR apparatus (CFX Connect, Bio-Rad Laboratories, Inc.).

Note that the crRNA sequences are as follows.

Figure 6:
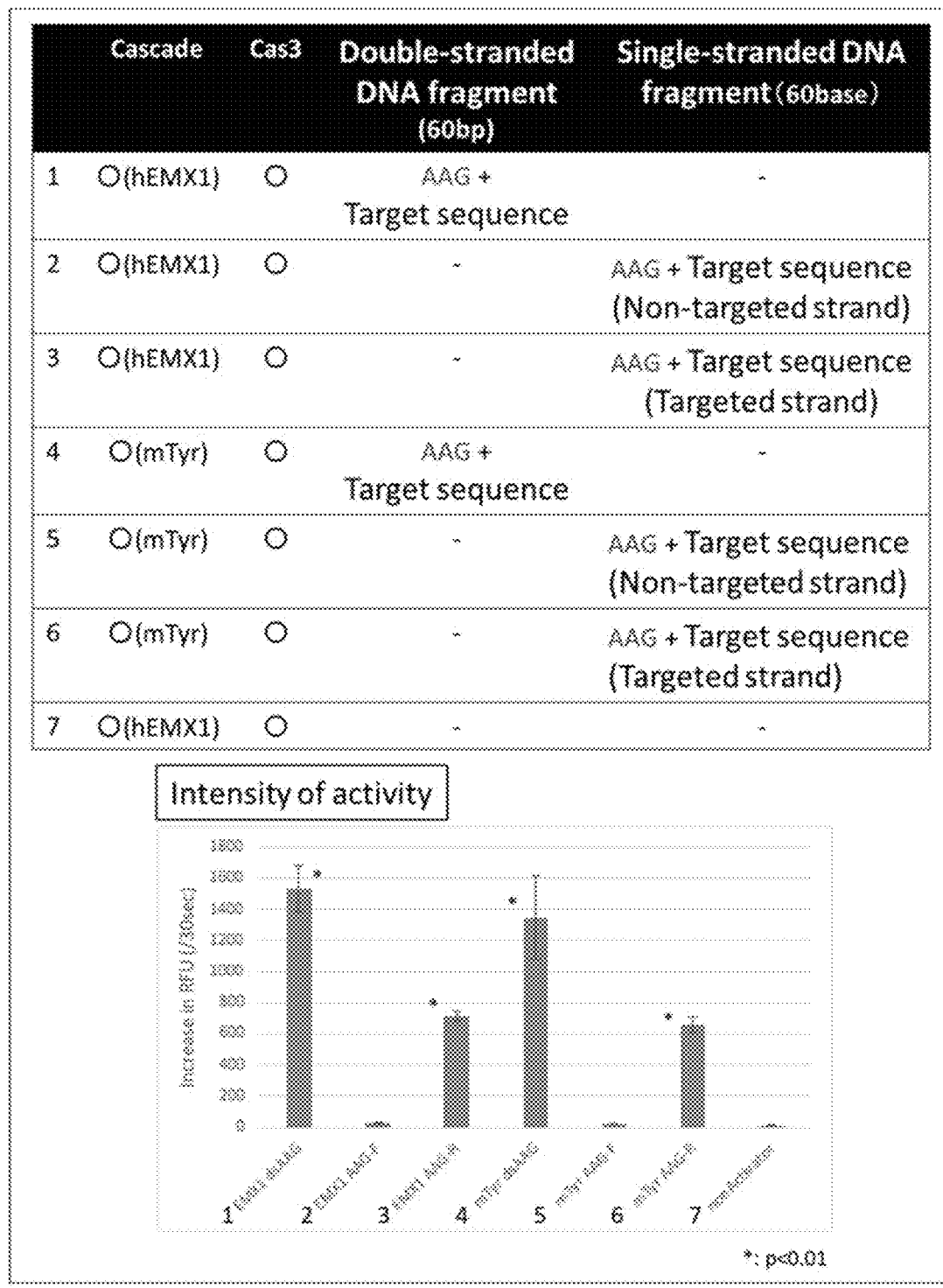
FIG. 6 is a diagram showing results of detecting that the CRISPR-Cas3 system non-specifically cleaved single-stranded DNA in the presence of hEMX1 target sequence or mTyr target sequence by using a probe (Taqman™ probe) which emits fluorescence upon cleavage. In the present experiment, single-stranded DNA was used as the target sequence. The upper part of the diagram shows compositions of samples, and the lower part of the diagram represents the degree of increase in fluorescence intensity as the intensity of the activity. It was possible to induce non-specific single-stranded DNA cleavage as in the case of double-stranded DNA fragment even when the target sequence recognized by the CRISPR-Cas3 was single-stranded DNA fragment. N=3.
<Xofluza-resistant Mutation>
For detecting the wild type; H1N1-Cascade-I38:

SEQ ID NO: 33
TGCAGCAAACTTATTAGTTTCAATTTTGGGGT/

For detecting the wild type; H3N2-Cascade-I38:

SEQ ID NO: 34
TGCACTCACTTGGAGGTGTGTTTCATGTATTC/.

<Tamiflu-resistant Mutation>

For detecting the mutated type; H1N1-Cascade-I222:

SEQ ID NO: 35
ATTGAGAACACAAGAGTCTGAATGTGCATGTG/

For detecting the mutated type;H1N1-Cascade-H274:

SEQ ID NO: 36
TAATTAGGGGCTTTCATTTCGACTGATTTGAT/

For detecting the mutated type;H3N2-Cascade-N294:

SEQ ID NO: 37
CTGTCTCTGCAGACACATCTGACACCAGGATA/.

In addition, DNA fragment sequences for detecting drug-resistant mutations of influenza viruses are as follows (the underlines indicate bases corresponding to the mutation sites).

H1N1-PA-I38:

SEQ ID NO: 38
GGGAAGACCCCAAAATTGAAACTAATAAGTTTGCTGCAATTTG

CACACATTTGGAAGTTTGTTTCATGTATTCGGATTTC/

H1N1-PA-I38T:

SEQ ID NO: 39
GGGAAGACCCCAAAATTGAAACTAATAAGTTTGCTGCAACTTG

CACACATTTGGAAGTTTGTTTCATGTATTCGGATTTC/

H3N2-PA-I38:

SEQ ID NO: 40
GGGGAGGATCTGAAAATTGAAACCAACAAATTTGCAGCAATATG

CACTCACTTGGAGGTGTGTTTCATGTATTCAGATTT/

H3N2-PA-I38T:

SEQ ID NO: 41
GGGGAGGATCTGAAAATTGAAACCAACAAATTTGCAGCAACATG

CACTCACTTGGAGGTGTGTTTCATGTATTCAGATTT/

H1N1-NA-I222:

SEQ ID NO: 42
GGCATAATAACAGACACTATCAAGAGTTGGAGGAACAATATAT

TGAGAACACAAGAGTCTGAATGTGCATGTGTAAATGG/

H1N1-NA-I222R:

SEQ ID NO: 43
GGCATAATAACAGACACTATCAAGAGTTGGAGGAACAATAGAT

TGAGAACACAAGAGTCTGAATGTGCATGTGTAAATGG/

H1N1-NA-H274:

SEQ ID NO: 44
AAAGATAATCAAATCAGTCGAAATGAAAGCCCCTAATTATCACT

ATGAGGAATGCTCCTGTTACCCTGATTCTAGTGAAA/

H1N1-NA-H274Y:

SEQ ID NO: 45
AAAGATAATCAAATCAGTCGAAATGAAAGCCCCTAATTATTACT

ATGAGGAATGCTCCTGTTACCCTGATTCTAGTGAAA/

-continued

H3N2-PA-N294:

SEQ ID NO: 46
TATCCTCGATATCCTGGTGTCAGATGTGTCTGCAGAGACAACTG

GAAAGGATCCAACCGGCCCATCATAGATATAAACAT/

H3N2-PA-N294S:

SEQ ID NO: 47
TATCCTCGATATCCTGGTGTCAGATGTGTCTGCAGAGACAGCTG

GAAAGGATCCAACCGGCCCATCATAGATATAAACAT/.

B. Results

As a result of measuring non-specific cleavages by electrophoresis, the cleavage activity of the single-stranded DNA was not detected without the DNA fragments containing the target sequences in any of the cases of the Cas3 protein only, the Cascade complex only, or the combination of the Cas3 protein and the Cascade complex. On the other hand, in the case where the DNA fragment containing the PAM sequence (AAG or ATG) which was recognizable by the CRISPR-Cas3 system and the target sequence was mixed, the decomposition of the donor single-stranded DNA was detected (arrows in FIG. 1). On the other hand, in the case where the DNA fragment in which the PAM sequence was changed to the PAM sequence (CCA) which was not recognizable by the CRISPR-Cas3 system was mixed, the decomposition of the donor DNA was not detected. In the case where the cyclic single-stranded DNA was targeted as well, although the cleavage activity by the CRISPR-Cas3 system was observed, the cleavage activity was slightly lower than the case where the linear single-stranded DNA was targeted. On the other hand, as a result of using the double-stranded DNA as the donor DNA, the decomposition of the DNA was not detected even in the presence of the DNA fragment containing the target sequence (arrows in FIG. 2). From the above-described result, it was revealed that the CRISPR-Cas3 system exhibited the cleavage activity of a non-specific single-stranded DNA only in the presence of the target sequence.

Next, by utilizing the characteristics of this CRISPR-Cas3 system, it was studied whether or not it was possible to detect the presence or absence of the target sequence by using a fluorescent probe (DNaseAlert™; a probe in which a fluorescent dye "HEX" and a quencher "dark quencher" were bound to the respective ends). Fluorescence signals were measured with time by mixing a substrate (fluorescent probe) that emits fluorescence upon DNA decomposition (DNase). As a result, it was revealed that the fluorescence signals were strongly detected only in the case where the DNA fragment containing the PAM sequence (AAG or ATG) which was recognizable by the CRISPR-Cas3 system and the target sequence was mixed (FIG. 3). The same result was obtained also in the case where mTyr was used as the target sequence (FIG. 4). In order to more precisely detect the decomposition of the single-stranded DNA, studies were conducted using a fluorescent probe (Taqman™ probe; a double-quencher probe in which a fluorescent dye "HEX" and a quencher "IBFQ" were bound to the respective ends and into which "ZEN" was introduced as the internal quencher). As a result, it was revealed that the fluorescence signals were detected only in the case where the CRISPR-Cas3 system was able to recognize the target sequence (FIG. 5).

Moreover, in order to check whether or not the CRISPR-Cas3 system exhibits non-specific single-stranded DNA cleavage activity even when target DNA is single-stranded, an experiment using a single-stranded DNA fragment as target DNA was conducted. As a result, it was revealed that the CRISPR-Cas3 system significantly exhibited non-specific single-stranded DNA cleavage activity even when the target DNA was single-stranded (target strand) (FIG. 6).

From the above-described results, it was found that the non-specific cleavage activity of the single-stranded DNA present therearound was induced by the CRISPR-Cas3 system recognizing the sequence of the target DNA (which may be a single-stranded DNA or may be a double-stranded DNA). In addition, it was found that it was possible to simply and easily as well as efficiently determine the activity of the CRISPR-Cas3 system by using a fluorescent probe.

Figure 7:
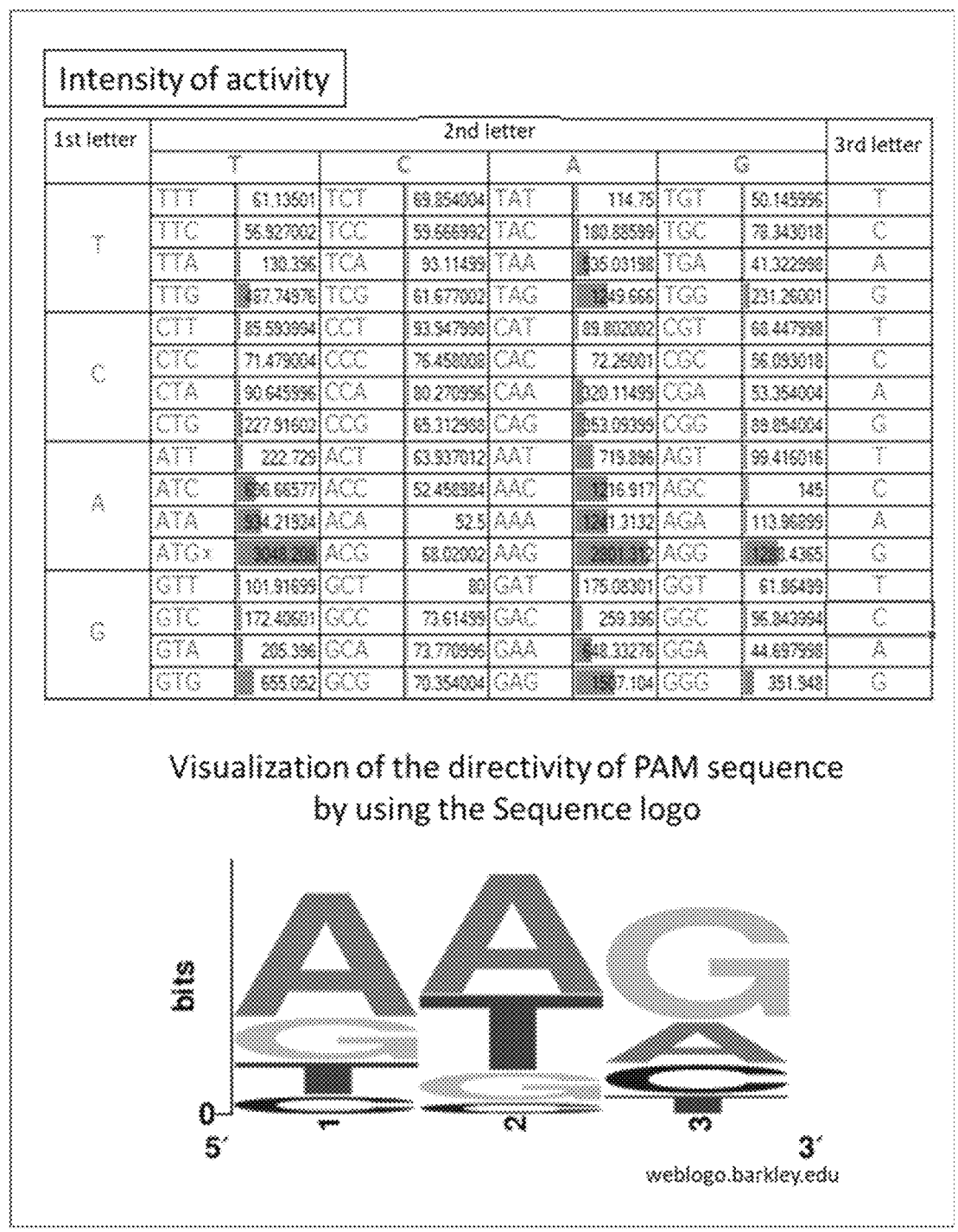
FIG. 7 is a diagram showing result of evaluating the same experiment as in FIG. 5 with various PAM sequences (64 types). The upper part of the diagram shows the results of measuring the intensity of the activity, and the lower part of the diagram visualizes the directivity of PAM sequence by using the Sequence logo. N=3.

Next, in order to study differences in single-stranded DNA cleavage activity due to differences in target specificity of the CRISPR-Cas3 system, the PAM sequences in the target double-stranded DNA fragments were modified, and the activity was measured for all the PAM sequence patterns. As a result, it was revealed that while high intensity of the activity was exhibited with the conventionally reported PAM sequences (AAG, ATG, and the like), in the case where the first base or the second base was C and the case where the third base was T, almost no activity was exhibited (FIG. 7). Since the change of a single base on the PAM sequence affected the non-specific single-stranded DNA cleavage activity by the CRISPR-Cas3 system, it was found that based on the activity as indication, it was possible to detect target DNAs in samples with specificity on a single base level.

Figure 9:
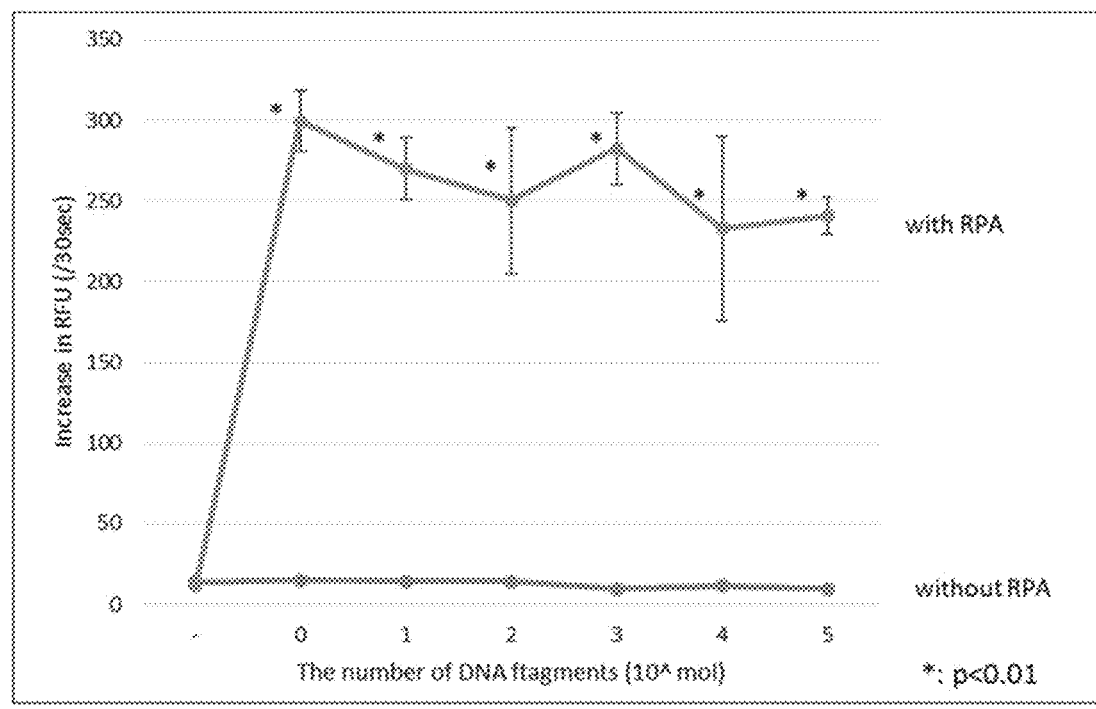
FIG. 9 is a diagram showing results of detecting 1 copy of the DNA fragment in the same experiment as in FIG. 5. In order to detect 1 copy of the DNA fragment in samples, DNA amplification by the RPA method was used. N=3.
Figure 10:
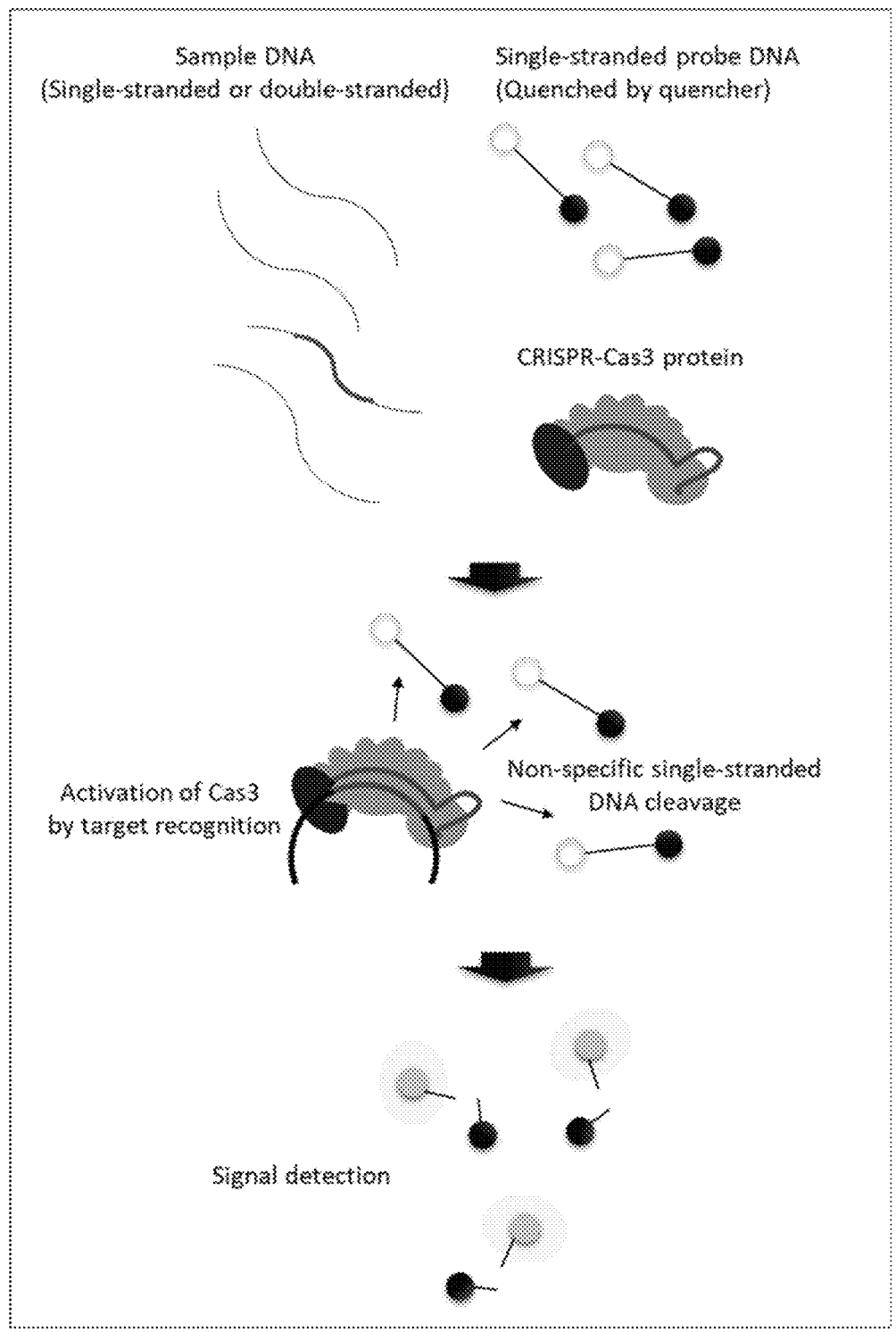
FIG. 10 is a diagram showing the overview of the detection method of the present invention utilizing the non-specific single-stranded DNA cleavage activity by the CRISPR-Cas3 system.

Next, in order to study the limit concentration of target DNA that was able to be detected, the target DNA fragment was diluted by limiting dilution and adjusted from 1 copy to $10^{12}$ copies, and the intensity of the activity in the target DNA fragment of each concentration was measured. As a result, significant signals were detected in the case where target DNAs of $10^{10}$ copies or more were used (FIG. 8). It has been reported that existing systems using Cas12a and Cas13 also exhibit detection sensitivities of around $10^{10}$ copies, and it was revealed that the CRISPR-Cas3 system exhibited comparable detection sensitivity. Furthermore, DNAs in these diluted samples were amplified using the RPA method, and the intensity of the activity was measured again. As a result, even for a sample that initially contained only 1 copy of the target DNA, the non-specific single-stranded DNA cleavage activity was detected (FIG. 9). From the above, it was revealed that it was possible to detect an infinitesimal amount (for example, 1 copy) of a target DNA in a sample using the CRISPR-Cas3 system only by combining the CRISPR-Cas3 system with a simple and easy gene amplification method such as the RPA method.

Figure 11:
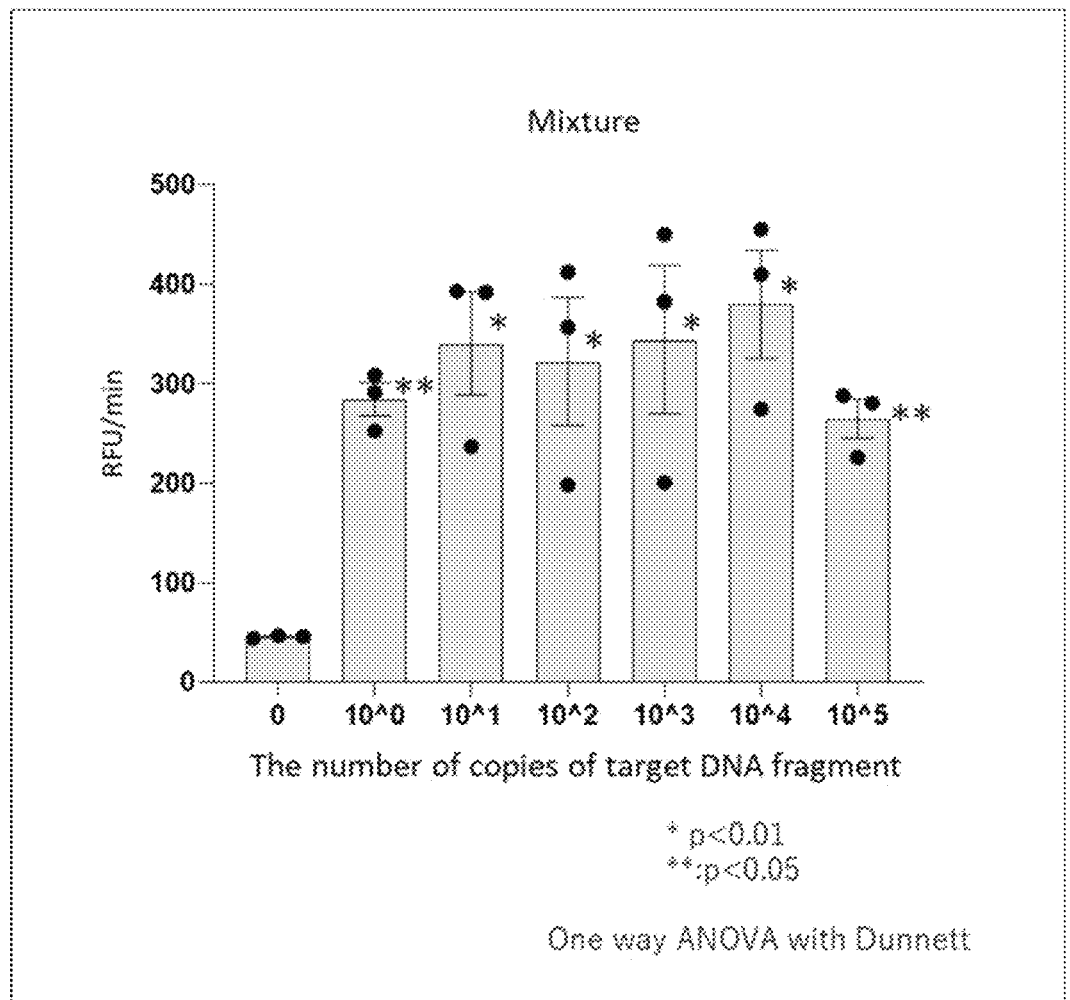
FIG. 11 is a diagram showing results of conducting the same experiment as in FIG. 9 by using mixed genome solutions containing the target DNA fragment and mouse genomic DNA.

In addition, in order to study the limit concentration of the target DNA in the presence of a large number of non-specific DNA sequences, mouse genomic DNA was mixed into a dilution of the target DNA fragment obtained through limiting dilution, and the intensity of the activity was measured. As a result, it was possible to detect the target DNA even with the sample containing only 1 copy of the target DNA like in FIG. 9 (FIG. 11). That is, it was revealed that it was possible to specifically detect 1 copy or more of the target DNA even when other DNAs were contained, by amplifying the target DNA by a method such as the RPA method.

Figure 12:
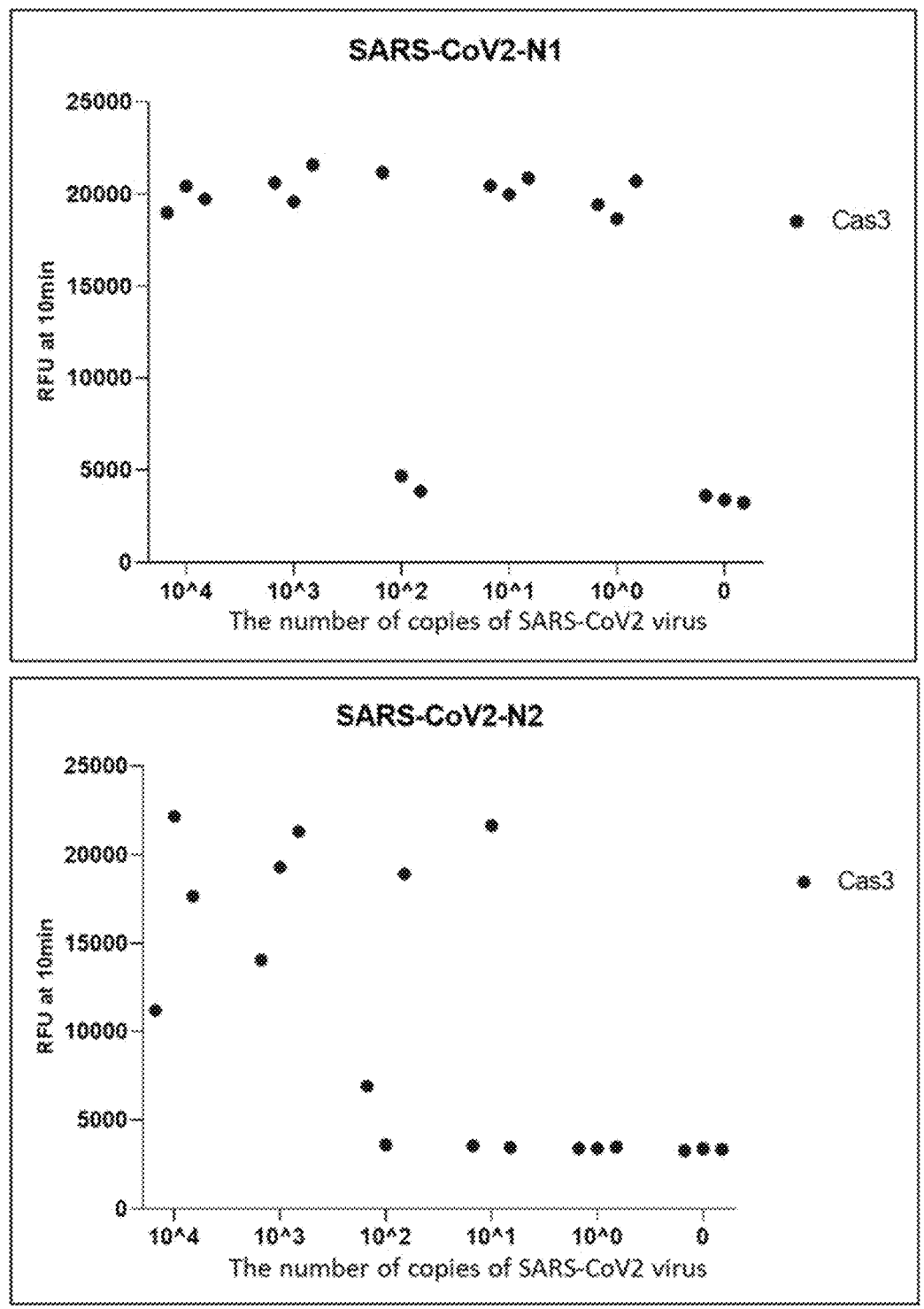
FIG. 12 is a diagram showing results of conducting the same experiment as in FIG. 9 by using genomes of the novel coronavirus amplified by the RT-LAMP method.

In order to prove that the present invention can be utilized for detecting viruses of emerging infectious diseases and the like in practice, two Cascade complexes (N1, N2) specific to the N genes of the novel coronaviruses (SARS-CoV2) were synthesized. The RT-LAMP method was conducted for each region, and amplified virus genomes were mixed with Cas3 and Cascade complex protein. As a result, it was possible to detect the signal in the virus RNA sample containing 1 copy of N1 and 10 copies of N2. It was possible to detect signals in all of the samples containing 1000 copies or more of both viruses (FIG. 12).

Figure 13A:
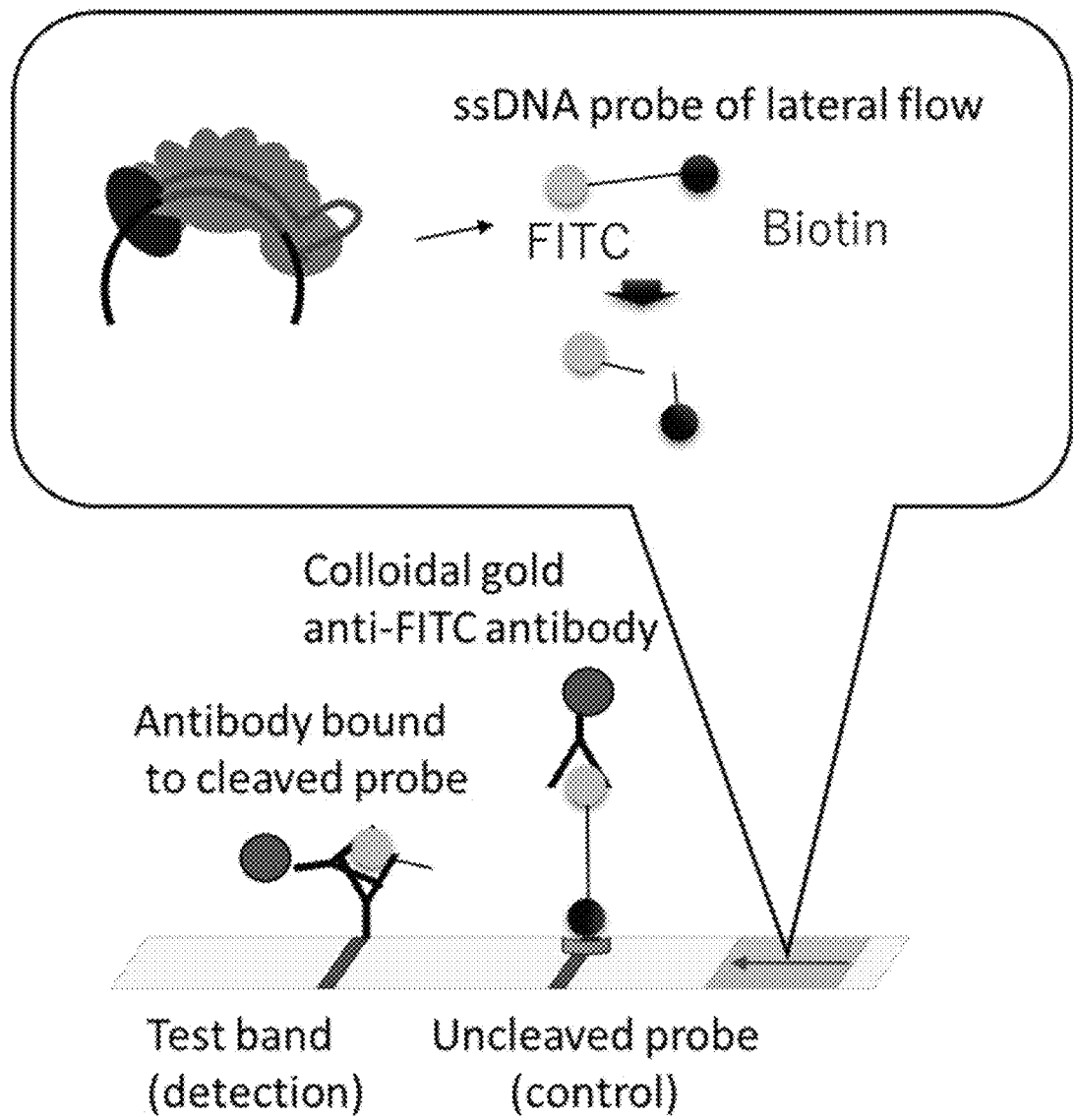
FIG. 13A is a diagram showing the principle of detection of the lateral flow assay utilized in the detection of the novel coronavirus.
Figure 13B:
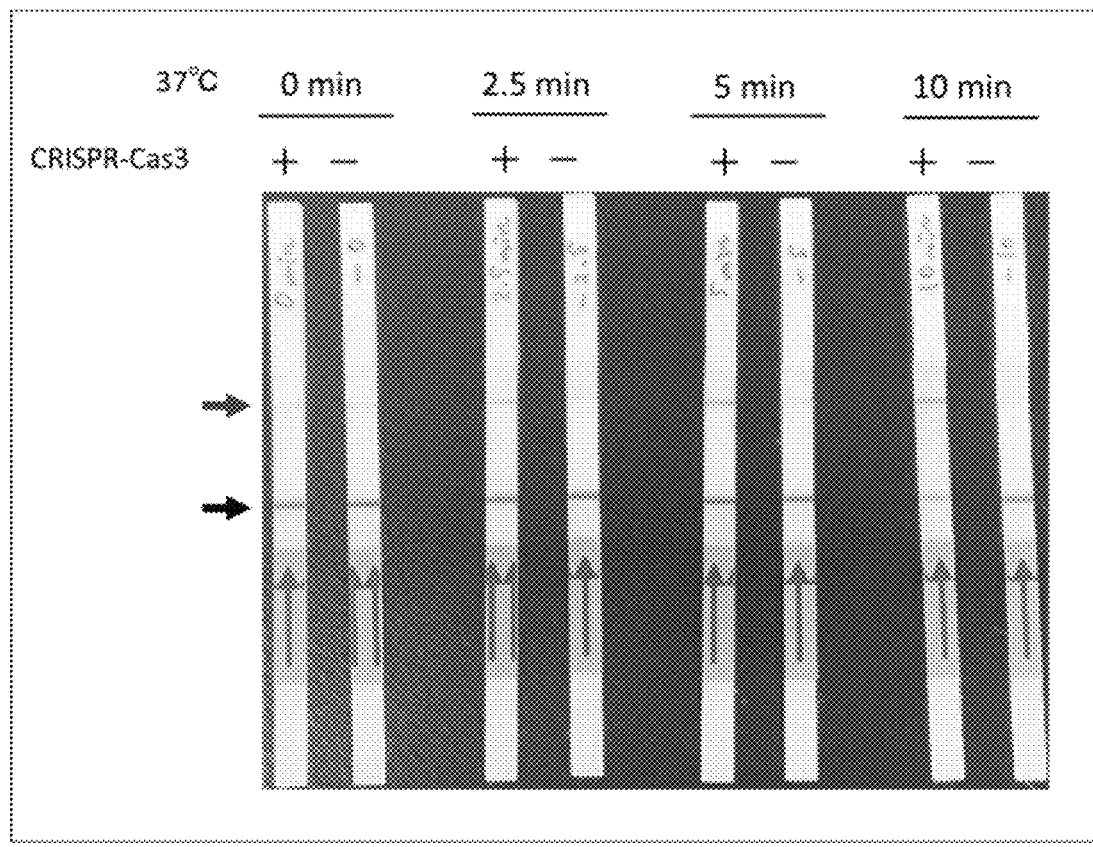
FIG. 13B is a diagram showing results of detecting the novel coronavirus by using the lateral flow assay of FIG. 13A.

Next, in order to detect novel coronaviruses in lateral flow assay (FIG. 13A), virus genomes amplified by the RT-LAMP method were mixed with a signal probe labeled with FITC and biotin, Cas3, and the Cascade complex protein, and one end (on the control line side) of a lateral flow test strip was immersed in the reaction system. As a result, the signal of the positive band in the lateral flow test strip was intensified depending on the reaction time, and it was revealed that it was possible to sufficiently determine the presence or absence of the band when reaction was made at 37° C. for 10 minutes (FIG. 13B).

Figure 14:
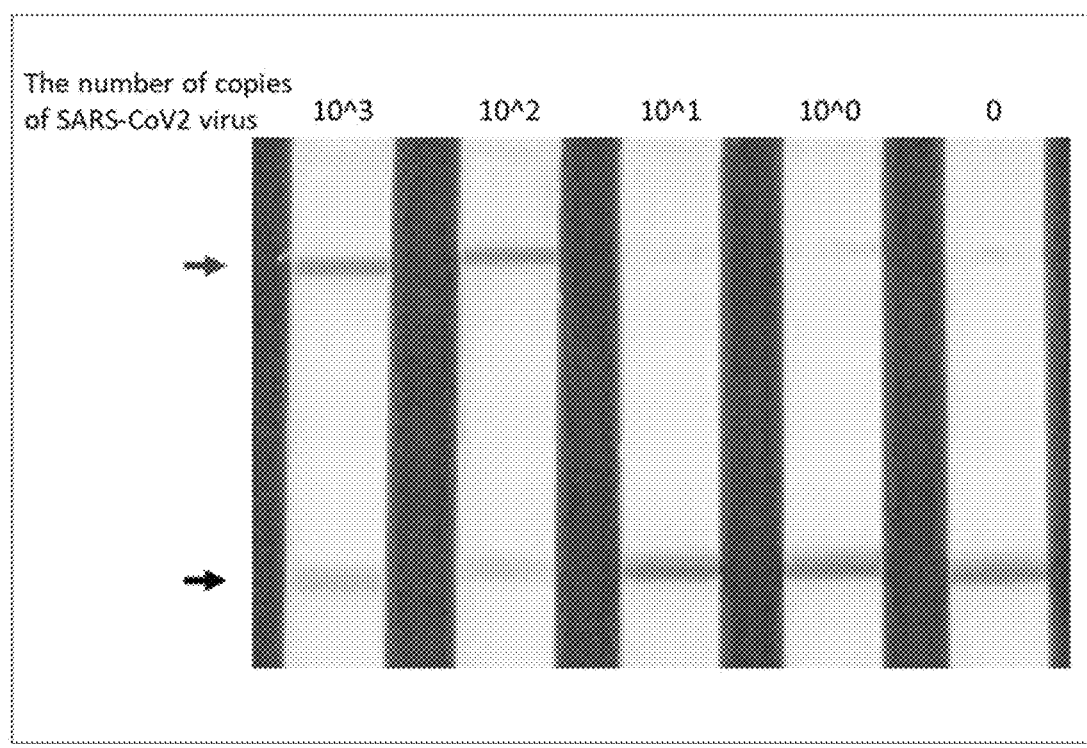
FIG. 14 is a diagram showing results of conducting the lateral flow assay on samples of serially diluted virus RNA in the same manner as in FIG. 13B.

Furthermore, as a result of conducting lateral flow assay on samples of serially diluted virus RNA, it was revealed that sufficient determination was possible in the case of using 100 copies of the sample (FIG. 14).

Figure 15:
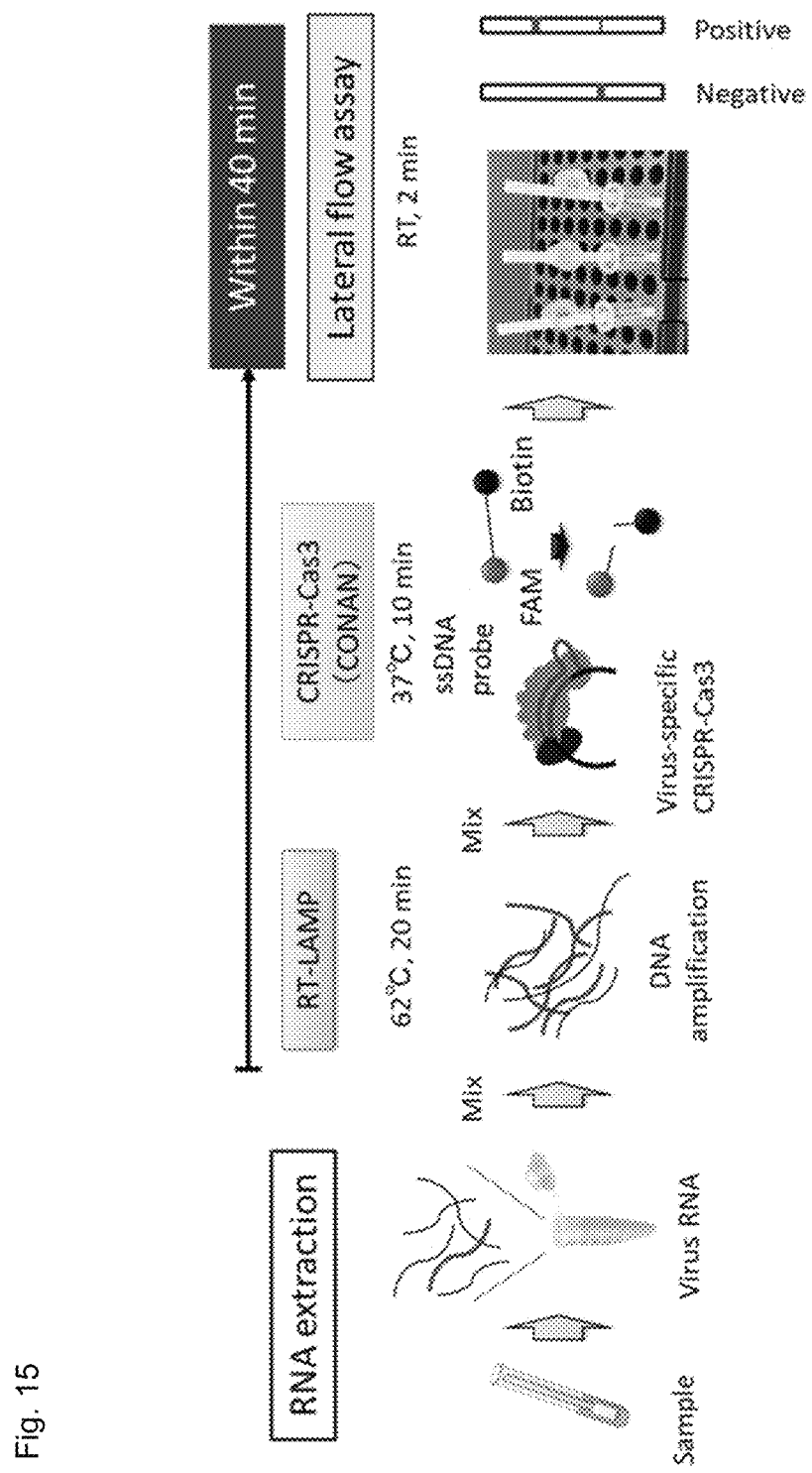
FIG. 15 is a diagram showing flow of the method (CO-NAN method) of the present invention for detecting an RNA virus with the lateral flow assay.

The overview of the assay in the present experiment is summarized in FIG. 15. From the above-described results, it was proved that it was possible to simply and easily detect the novel coronavirus (SARS-CoV2) by using the Cascade complex and the Cas3 protein.

Figure 16:
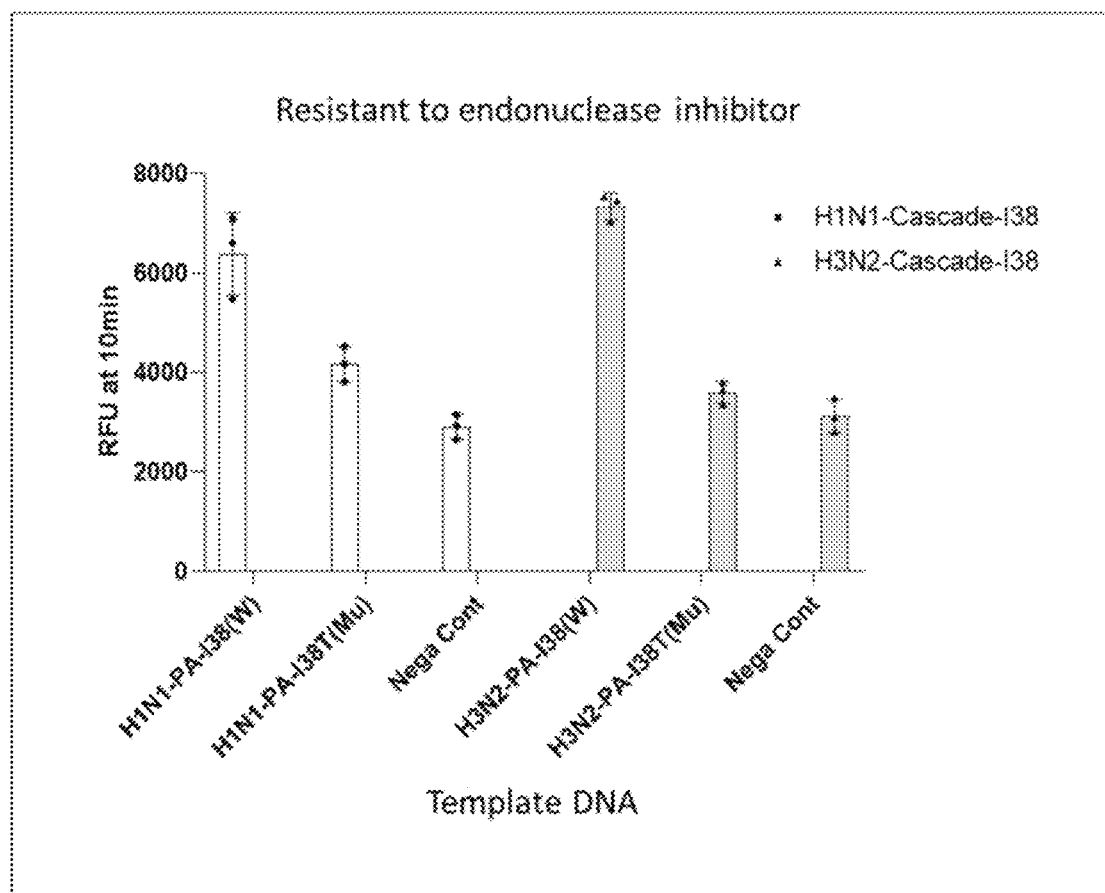
FIG. 16 is a diagram showing results of detecting Xofluza-resistant mutation sites of the type A influenza viruses (H1N1 and H3N2) by using the Taqman™ probe. The genes with wild-type mutation sites were detected.

Next, it was studied whether it was possible, by using the CRISPR-Cas3 system, to detect single nucleotide mutations which the influenza viruses resistant to baloxavir marboxil drugs (Xofluza and the like) and neuraminidase inhibitors (Tamiflu, Relenza, and the like) had. As a result of detecting those for I38T of the RNA polymerase (PA) gene of type A influenza viruses (H1N1 and H3N2), which was known as Xofluza-resistant mutations, significantly strong signals were successfully obtained in wild-type sequences for both H1N1 and H3N2 (FIG. 16).

Figure 17:
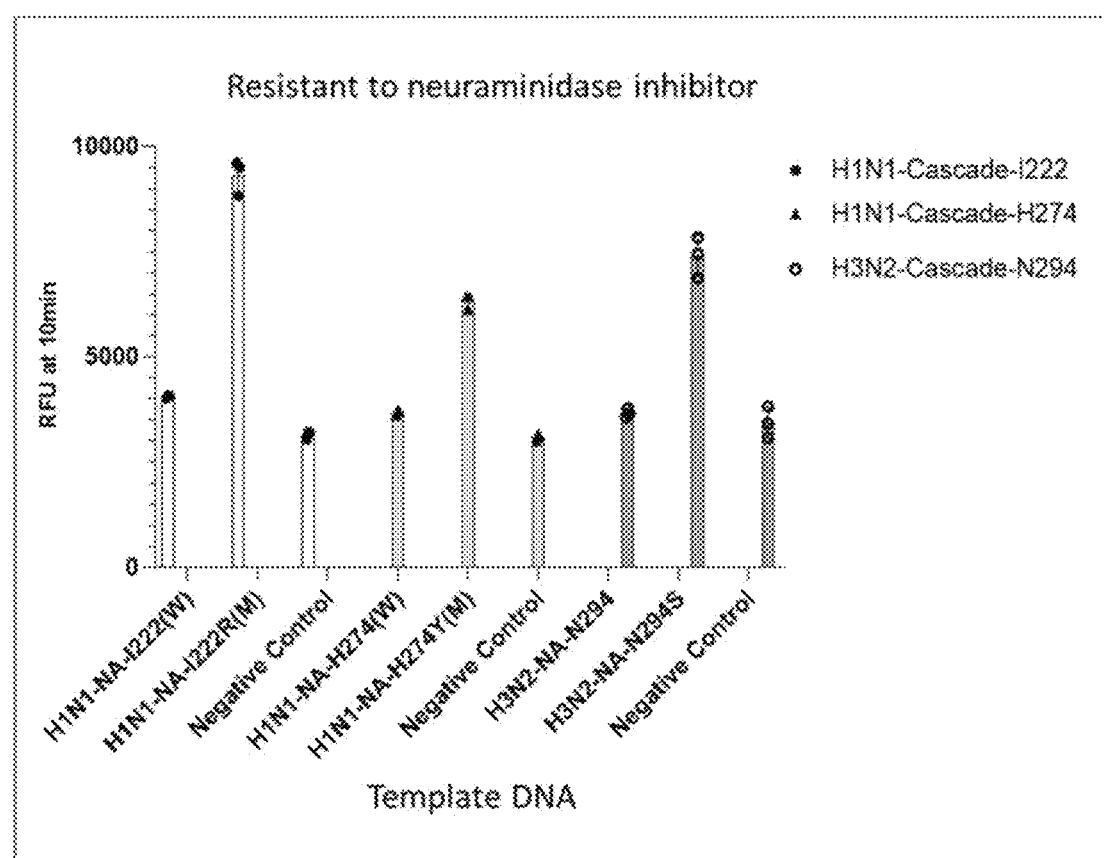
FIG. 17 is a diagram showing results of detecting Tamiflu-resistant mutation sites of the type A influenza viruses (H1N1 and H3N2) by using the Tagman™ probe. The genes with mutated-type mutation site were detected.

Subsequently, as a result of detecting those for mutations (H1N1: I222R or H274Y and H3N2: N294S) of the neuraminidase (NA) gene which are known as mutations resistant to Tamiflu and Relenza of the type A influenza viruses, significantly strong signals were successfully obtained in mutated sequences for both H1N1 and H3N2 (FIG. 17).

From the above, drug-resistant mutations on a single base level were successfully detected by designing the target sequence of crRNA in the CRISPR-Cas3 system for the mutation sites.

INDUSTRIAL APPLICABILITY

The present invention makes it possible to simply and easily as well as efficiently detect target DNAs in samples by utilizing the CRISPR-Cas3 system and the single-stranded probe DNA. The present invention greatly contributes, for example, to diagnoses of infections with viruses, pathogenic bacteria, protozoa, diagnoses of mutation and polymorphism of genes related to risks of diseases, efficacies of drugs, and the like, and the like.

The invention claimed is:

1. A method for detecting a specific DNA in a sample comprising the steps of:
   (a) contacting the sample with a CRISPR-Cas3 system targeting the specific DNA and a single-stranded probe DNA; and
   (b) detecting cleavage of the single-stranded probe DNA by the CRISPR-Cas3 system that occurs in a case where the specific DNA is present in the sample.

* * * * *